United States Patent
Major et al.

(10) Patent No.: US 7,209,955 B1
(45) Date of Patent: Apr. 24, 2007

(54) NOTIFICATION SYSTEM AND METHOD FOR A MOBILE DATA COMMUNICATION DEVICE

(75) Inventors: Harry Major, Waterloo (CA); Krishna K. Pathiyal, Waterloo (CA); Gary P. Mousseau, Waterloo (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 09/545,962

(22) Filed: Apr. 10, 2000

Related U.S. Application Data

(63) Continuation-in-part of application No. 09/087,623, filed on May 29, 1998, now Pat. No. 6,219,694.

(51) Int. Cl.
*G06F 15/16* (2006.01)

(52) U.S. Cl. .................................................. 709/207
(58) Field of Classification Search ............ 340/825.44, 340/7.59, 7.58, 7.1, 7.29, 7.62; 709/204–207; 455/566, 557
See application file for complete search history.

(56) References Cited

U.S. PATENT DOCUMENTS

| | | | |
|---|---|---|---|
| 4,106,060 A | | 8/1978 | Chapman, Jr. |
| 4,438,433 A | * | 3/1984 | Smoot et al. .............. 340/7.59 |
| 4,558,454 A | * | 12/1985 | Hills et al. |
| 4,644,351 A | * | 2/1987 | Zabarsky et al. |
| 4,695,880 A | | 9/1987 | Johnson et al. |
| 4,697,281 A | | 9/1987 | O'Sullivan |
| 4,713,780 A | | 12/1987 | Schultz et al. |
| 4,837,798 A | | 6/1989 | Cohen et al. |
| 4,837,800 A | | 6/1989 | Freeburg et al. |
| 4,856,047 A | | 8/1989 | Saunders |
| 4,928,096 A | | 5/1990 | Leonardo et al. |
| 4,951,044 A | | 8/1990 | Nelson et al. |
| 4,980,907 A | | 12/1990 | Raith et al. |
| 5,008,926 A | | 4/1991 | Misholi |
| 5,043,721 A | | 8/1991 | May |
| 5,058,431 A | * | 10/1991 | Karwacki |
| 5,086,502 A | | 2/1992 | Malcolm |
| 5,125,021 A | | 6/1992 | Lebowitz |

(Continued)

FOREIGN PATENT DOCUMENTS

| | | |
|---|---|---|
| AU | 78434/98 | 7/1997 |
| EP | 0 001 552 | 5/1979 |
| EP | 0 617 373 A2 | 4/1994 |

(Continued)

OTHER PUBLICATIONS

Briere et al., One mailbox, just like the old times, Network World, Framingham, Apr. 21, 1997, vol. 14, pp. 21ff.*
Copy of DTS Wireless Website located at D.R.L. http://www.dtswireless.com.
"3Com PalmPilot Gets Wireless Link for E-Mail", Spooner, John G., PC Week, Dec. 8, 1997.

(Continued)

*Primary Examiner*—Krisna Lim
*Assistant Examiner*—Sean Reilly
(74) *Attorney, Agent, or Firm*—Danamraj & Youst, P.C.

(57) ABSTRACT

A notification system and method for a mobile data communication device is provided. A clientbased software program operates at the mobile communication device to manage and execute, user-selectable notification schemes ("notification module") in response to data items transmitted to the mobile device from a host system via a communications network. The user configures the notification module to execute certain audible, visual and/or tactile notifications in response to certain types of messages being received at the mobile device.

8 Claims, 8 Drawing Sheets

U.S. PATENT DOCUMENTS

| | | | |
|---|---|---|---|
| 5,127,041 A | 6/1992 | O'Sullivan | |
| 5,136,291 A | 8/1992 | Teague | |
| 5,157,660 A | 10/1992 | Kuwahara et al. | |
| 5,159,592 A | 10/1992 | Perkins | |
| 5,177,680 A | 1/1993 | Tsukino et al. | |
| 5,181,200 A | 1/1993 | Harrison | |
| 5,265,033 A | 11/1993 | Vajk et al. | |
| 5,283,887 A | 2/1994 | Zachery | |
| 5,293,250 A | 3/1994 | Okumura et al. | |
| 5,299,255 A | 3/1994 | Iwaki et al. | |
| 5,307,059 A * | 4/1994 | Connary et al. | 340/4.62 |
| 5,313,582 A | 5/1994 | Hendel et al. | |
| 5,315,635 A | 5/1994 | Kane et al. | |
| 5,333,152 A | 7/1994 | Wilber | |
| 5,333,266 A | 7/1994 | Boaz et al. | |
| 5,392,390 A | 2/1995 | Crozier | |
| 5,406,557 A | 4/1995 | Baudoin | |
| 5,410,543 A | 4/1995 | Seitz et al. | |
| 5,416,473 A | 5/1995 | Dulaney, III et al. | |
| 5,436,960 A | 7/1995 | Campana, Jr. et al. | |
| 5,438,611 A | 8/1995 | Campana, Jr. et al. | |
| 5,452,356 A | 9/1995 | Albert | |
| 5,479,472 A | 12/1995 | Campana, Jr. et al. | |
| 5,493,692 A | 2/1996 | Theimer et al. | |
| 5,495,484 A | 2/1996 | Self et al. | |
| 5,557,659 A * | 9/1996 | Hyde-Thomson | |
| 5,559,800 A | 9/1996 | Mousseau et al. | |
| 5,572,528 A | 11/1996 | Shuen | |
| 5,579,472 A | 11/1996 | Keyworth, II et al. | |
| 5,588,009 A | 12/1996 | Will | |
| 5,598,536 A | 1/1997 | Slaughter, III et al. | |
| 5,603,054 A | 2/1997 | Theimer et al. | |
| 5,604,491 A * | 2/1997 | Coonley et al. | 340/7.59 |
| 5,604,788 A | 2/1997 | Tett | |
| 5,625,670 A | 4/1997 | Campana, Jr. et al. | |
| 5,627,829 A | 5/1997 | Gleeson et al. | |
| 5,630,060 A | 5/1997 | Tang et al. | |
| 5,633,810 A | 5/1997 | Mandal et al. | |
| 5,638,450 A | 6/1997 | Robson | |
| 5,641,946 A | 6/1997 | Campana, Jr. et al. | |
| 5,666,530 A | 9/1997 | Clark et al. | |
| 5,666,553 A | 9/1997 | Corzier | |
| 5,673,322 A | 9/1997 | Pepe et al. | |
| 5,705,995 A * | 1/1998 | Laflin et al. | 340/7.59 |
| 5,727,202 A | 3/1998 | Kucala | |
| 5,729,735 A | 3/1998 | Meyering | |
| 5,737,531 A | 4/1998 | Ehley | |
| 5,742,905 A | 4/1998 | Pepe et al. | |
| 5,751,960 A * | 5/1998 | Matsunaga | |
| 5,751,971 A | 5/1998 | Dobbins et al. | |
| 5,754,954 A | 5/1998 | Cannon et al. | |
| 5,757,901 A | 5/1998 | Hiroshige | |
| 5,761,416 A | 6/1998 | Mandal et al. | |
| 5,764,639 A | 6/1998 | Staples et al. | |
| 5,765,170 A | 6/1998 | Morikawa | |
| 5,781,614 A | 7/1998 | Brunson | |
| 5,781,901 A | 7/1998 | Kuzma | |
| 5,790,790 A | 8/1998 | Smith et al. | |
| 5,790,974 A | 8/1998 | Tognazzini | |
| 5,796,806 A * | 8/1998 | Birckbichler | 379/88.2 |
| 5,812,671 A * | 9/1998 | Ross | |
| 5,812,819 A | 9/1998 | Rodwin et al. | |
| 5,813,016 A | 9/1998 | Suminmto | |
| 5,815,081 A * | 9/1998 | Motohashi | 340/7.58 |
| 5,819,172 A | 10/1998 | Camapana, Jr. et al. | |
| 5,819,284 A | 10/1998 | Farber et al. | |
| 5,822,434 A | 10/1998 | Caronni et al. | |
| 5,826,062 A | 10/1998 | Fake, Jr. et al. | |
| 5,838,252 A * | 11/1998 | Kikinis | |
| 5,838,926 A | 11/1998 | Yamagishi | |
| 5,844,969 A | 12/1998 | Goldman et al. | |
| 5,850,219 A | 12/1998 | Kumomura | |
| 5,862,325 A * | 1/1999 | Reed et al. | |
| 5,867,660 A | 2/1999 | Schmidt et al. | |
| 5,878,434 A | 3/1999 | Draper et al. | |
| 5,900,875 A * | 5/1999 | Haitani et al. | |
| 5,903,723 A | 5/1999 | Beck et al. | |
| 5,905,777 A | 5/1999 | Foladare et al. | |
| 5,917,629 A * | 6/1999 | Hortensius et al. | |
| 5,928,329 A | 7/1999 | Clark et al. | |
| 5,937,161 A | 8/1999 | Mulligan et al. | |
| 5,941,956 A * | 8/1999 | Shirakihara et al. | |
| 5,943,426 A * | 8/1999 | Frith et al. | |
| 5,953,322 A | 9/1999 | Kimball | |
| 5,960,406 A * | 9/1999 | Rasansky et al. | |
| 5,961,590 A | 10/1999 | Mendez et al. | |
| 5,966,663 A * | 10/1999 | Gleason | |
| 5,968,131 A * | 10/1999 | Mendez et al. | |
| 5,969,636 A * | 10/1999 | Parvulescu et al. | 340/7.53 |
| 5,973,612 A * | 10/1999 | Deo et al. | 340/825.44 |
| 5,974,180 A | 10/1999 | Schwendeman | |
| 5,974,238 A | 10/1999 | Chase, Jr. | |
| 5,978,689 A * | 11/1999 | Tuoriniemi et al. | 455/569 |
| 5,978,837 A | 11/1999 | Foladare et al. | |
| 5,983,073 A | 11/1999 | Ditzik | |
| 5,987,508 A * | 11/1999 | Agraharam et al. | |
| 5,995,597 A | 11/1999 | Woltz et al. | |
| 6,000,000 A | 12/1999 | Hawkins et al. | |
| 6,002,769 A * | 12/1999 | McGough | |
| 6,006,274 A | 12/1999 | Hawkins et al. | |
| 6,014,429 A | 1/2000 | LaPorta et al. | |
| 6,018,762 A * | 1/2000 | Brunson et al. | |
| 6,018,782 A * | 1/2000 | Hartmann | |
| 6,023,000 A * | 2/2000 | Fritz-Langhals et al. | |
| 6,023,700 A | 2/2000 | Owens et al. | |
| 6,023,708 A * | 2/2000 | Mendez et al. | |
| 6,034,621 A | 3/2000 | Kaufman | |
| 6,044,205 A | 3/2000 | Reed et al. | |
| 6,052,442 A * | 4/2000 | Cooper et al. | |
| 6,052,563 A | 4/2000 | Macko | |
| 6,052,735 A * | 4/2000 | Ulrich et al. | 709/236 |
| 6,058,431 A | 5/2000 | Srisuresh et al. | |
| 6,073,165 A | 6/2000 | Narasimhan et al. | |
| 6,078,826 A * | 6/2000 | Croft et al. | 455/574 |
| 6,078,921 A | 6/2000 | Kelley | |
| 6,084,969 A * | 7/2000 | Wright et al. | |
| 6,085,192 A * | 7/2000 | Mendez et al. | |
| 6,085,232 A | 7/2000 | Kikinis | |
| 6,091,951 A | 7/2000 | Sturniolo et al. | |
| 6,092,114 A | 7/2000 | Shaffer et al. | |
| 6,092,191 A | 7/2000 | Shimbo et al. | |
| 6,101,531 A | 8/2000 | Eggleston et al. | |
| 6,115,394 A | 9/2000 | Balachandran et al. | |
| 6,115,736 A | 9/2000 | Devarakonda et al. | |
| 6,119,167 A * | 9/2000 | Boyle et al. | |
| 6,125,281 A | 9/2000 | Wells et al. | |
| 6,125,369 A | 9/2000 | Wu et al. | |
| 6,130,892 A | 10/2000 | Short et al. | |
| 6,138,089 A * | 10/2000 | Guberman | |
| 6,138,146 A * | 10/2000 | Moon et al. | 709/206 |
| 6,141,690 A | 10/2000 | Weiman | |
| 6,157,318 A * | 12/2000 | Minata | 340/7.58 |
| 6,157,630 A * | 12/2000 | Adler et al. | |
| 6,157,950 A | 12/2000 | Krishman | |
| 6,163,274 A | 12/2000 | LIndgren | |
| 6,167,379 A | 12/2000 | Dean et al. | |
| 6,178,331 B1 * | 1/2001 | Holmes et al. | 455/466 |
| 6,185,551 B1 * | 2/2001 | Birrell et al. | |
| 6,185,603 B1 * | 2/2001 | Henderson et al. | 709/206 |
| 6,202,085 B1 * | 3/2001 | Benson et al. | |
| 6,203,192 B1 * | 3/2001 | Fortman | |

| | | | |
|---|---|---|---|
| 6,205,448 B1 * | 3/2001 | Kruglikov et al. | |
| 6,208,996 B1 * | 3/2001 | Ben-Shachar et al. | |
| 6,219,694 B1 * | 4/2001 | Lazaridis et al. | |
| 6,233,341 B1 * | 5/2001 | Riggins | |
| 6,240,088 B1 | 5/2001 | Gayton et al. | |
| 6,249,820 B1 | 6/2001 | Dobbins et al. | |
| 6,256,666 B1 | 7/2001 | Singhal | |
| 6,272,545 B1 | 8/2001 | Flanagin et al. | |
| 6,275,848 B1 | 8/2001 | Arnold | |
| 6,275,850 B1 | 8/2001 | Beyda et al. | |
| 6,311,282 B1 * | 10/2001 | Nelson et al. | 713/324 |
| 6,313,734 B1 * | 11/2001 | Weiss et al. | |
| 6,314,108 B1 * | 11/2001 | Ramasubramani et al. | |
| 6,330,244 B1 * | 12/2001 | Swartz et al. | |
| 6,333,973 B1 * | 12/2001 | Smith et al. | |
| 6,351,764 B1 * | 2/2002 | Voticky et al. | 709/206 |
| 6,356,956 B1 * | 3/2002 | Deo et al. | |
| 6,360,272 B1 * | 3/2002 | Lincke et al. | |
| 6,370,566 B2 * | 4/2002 | Discolo et al. | |
| 6,389,455 B1 * | 5/2002 | Fuisz | |
| 6,400,810 B1 * | 6/2002 | Skladman et al. | 379/93.24 |
| 6,401,113 B2 * | 6/2002 | Lazaridis et al. | |
| 6,449,287 B1 * | 9/2002 | Leuca et al. | |
| 6,505,214 B1 * | 1/2003 | Sherman et al. | |
| 6,580,787 B1 * | 6/2003 | Akhteruzzaman et al. | |
| 6,611,358 B1 * | 8/2003 | Narayanaswamy | |
| 6,701,378 B1 * | 3/2004 | Gilhuly et al. | |
| 2001/0001552 A1 | 5/2001 | Vong | |
| 2001/0015977 A1 * | 8/2001 | Joansson | |
| 2001/0029531 A1 | 10/2001 | Ohta | |
| 2001/0040693 A1 | 11/2001 | Saito et al. | |
| 2001/0042093 A1 | 11/2001 | Shirai et al. | |
| 2001/0045885 A1 * | 11/2001 | Tett | |
| 2001/0054072 A1 | 12/2001 | Discolo et al. | |
| 2002/0010748 A1 * | 1/2002 | Kobayashi et al. | |
| 2002/0059380 A1 * | 5/2002 | Biliris et al. | |
| 2003/0097361 A1 * | 5/2003 | Huang et al. | |

FOREIGN PATENT DOCUMENTS

| | | |
|---|---|---|
| EP | 0617373 | 9/1994 |
| EP | 0 736 989 A2 | 9/1996 |
| EP | 0736989 | 10/1996 |
| EP | 0772327 | 5/1997 |
| EP | 0777394 | 6/1997 |
| EP | 0788287 | 8/1997 |
| EP | 09214556 | 8/1997 |
| EP | 0793387 | 9/1997 |
| EP | 0 825 788 A2 | 2/1998 |
| EP | 0825788 | 2/1998 |
| EP | 0838774 | 4/1998 |
| EP | 0838934 | 4/1998 |
| EP | 0772327 | 2/1999 |
| EP | 0 918 417 A2 | 5/1999 |
| EP | 0 930 766 A2 | 7/1999 |
| EP | 0930766 | 7/1999 |
| EP | 0 986 225 A1 | 3/2000 |
| JP | 09214556 | 8/1997 |
| JP | 9305155 | 11/1997 |
| JP | 11289346 A | 10/1999 |
| WO | 9619064 | 6/1996 |
| WO | WO 96/19064 | 6/1996 |
| WO | 9726709 | 7/1997 |
| WO | 9727717 | 7/1997 |
| WO | WO 97/27717 | 7/1997 |
| WO | WO 97/28518 | 8/1997 |
| WO | WO 97/32251 | 9/1997 |
| WO | 9732251 | 9/1997 |
| WO | 9733421 | 9/1997 |
| WO | 9741654 | 11/1997 |
| WO | 9744942 | 11/1997 |
| WO | 9800787 | 1/1998 |
| WO | WO 98/07897 | 2/1998 |
| WO | 9821911 | 5/1998 |
| WO | 9823108 | 5/1998 |
| WO | WO 98/23108 | 5/1998 |
| WO | WO 98/26344 | 6/1998 |
| WO | 9848560 | 10/1998 |
| WO | 98/48560 | 10/1998 |
| WO | WO 98/48560 | 10/1998 |
| WO | WO 99/05620 | 2/1999 |
| WO | WO 99/05813 | 2/1999 |
| WO | WO 99/06900 | 2/1999 |
| WO | WO 99/50974 | 2/1999 |
| WO | WO 99/45684 | 3/1999 |
| WO | 9917505 | 4/1999 |
| WO | WO 99/17505 | 4/1999 |
| WO | WO 99/19988 | 4/1999 |
| WO | 9919988 | 4/1999 |
| WO | WO 99/36870 | 7/1999 |
| WO | WO 99/45484 | 9/1999 |
| WO | 9945484 | 9/1999 |
| WO | WO 99/48312 | 9/1999 |
| WO | 9948312 | 9/1999 |
| WO | 9950974 | 10/1999 |
| WO | 9963709 | 12/1999 |
| WO | WO 99/63709 | 12/1999 |
| WO | WO 00/11567 | 3/2000 |
| WO | WO 00/11832 | 3/2000 |
| WO | WO 00/20994 | 4/2000 |
| WO | WO 00/31931 | 6/2000 |
| WO | WO 00/49819 | 8/2000 |
| WO | WO 01/01264 | 1/2001 |
| WO | WO 01/13572 A1 | 2/2001 |
| WO | WO 01/71539 A2 | 3/2001 |

OTHER PUBLICATIONS

"Have Your Pager Call My Pager", Sullivan, Kristina B., PC Week, Dec. 8, 1997.

Feibus, "A Desktop In Your Palm", Informationweek, Aug. 25, 1997, pp. 65ff.

Behr, "Handheld Solutions", Informationweek, Oct. 27, 1997, pp. 106–113.

Briere, Daniel, et al., "One Mailbox, Just Like Old Times," Network World, vol. 14, issue 16, p.21 (Apr. 21, 1997).

Padwick, et al., Special Edition Using Microsoft Outlook 97, 1997, Que Corporation, pp. 250–251, 353–367.

News Release, "Motorola Rings in 1995 with the Launch of the Marco® Wireless Communicator," Jan. 4, 1995 (4 pgs.).

Timeline, "FLEX™ Technology Timeline," (3 pgs.).

General Magic, Inc., Corporate Backgrounder, 2001 (2 pgs.).

Pegasus Email Settings, ABSnet Internet Services, Inc. (4 pgs.).

Motorola, Inc., emailVClient, 2001 (4 pages).

News Release, "Motorola Announces Pagewriter 250, The World's Smallest Pager with Full Keyboard", Feb. 27, 1997 (2 pgs.).

Dewey, Barney, "Communications Strategies for Newton 2.0," Newton Technology Journal, p. 10, Jun. 1996.

Press Release, "Motorola Announces New Solutions to Provide Consumers with Wrieless Access to Personal and Enterprise E–mail Accounts," Mar. 21, 2001 (4 pgs.).

"Motorola's 'Marco' Wireless Communicator," http://www.msu.edu/~luckie/gallery/marco.htm, Jun. 14, 2001 (3 pgs.).

News Release, "CE Software Announces MobileVision," Editorial Contacts, CE Software, Inc., 1995 (3 pgs.).

News Release, "CE Software Ships MobileVision," Jun. 20, 1995 (3 pgs.).

Newton Reference, Communications, 1996–1997(4 pgs.).

PC Pro Issue 31: Realword Computing, PDA Column, Jul. 30, 1997 (7 pgs.).

Enterprise Solutions for Email Overload, Founder Publications, http://www.amikanow.com/corporte/publications.htm, Aug. 6, 2001 (9 pgs.).

"Motorola's 'Marco' Wireless Communicator," http://www.msu.edu./–luckie/gallery/marco.htm, Aug. 6, 2001 (2 pgs.).

Press Release, "Apple Agrees to License Newton Technology to Schlumberger, Digital Ocean," Nov. 3, 1995 (3 pgs.).

Frezaz, Bill, "PDA, PDA, Wherefore Art Thou, PDA?", Freewire, Aug. 6, 2001 (6 pgs.).

Black, Lauren, et al., "Personal Digital Assistants," Macworld Reviews, Aug. 6, 2001 (5 pgs.).

Reference, "MobileVision Direct Wireless Connection to Your LAN–Based Electronic Mailbox," CE Software, Inc., pp. 1, 3, 5, 7, 9, 11, 13, 15, 17, 19, 21, 1995.

User Manual, "MobileVision Direct Wireless Connection to Your LAN–Based Electronic Mailbox," CE Software, Inc. 1995.

Johnson, David B., "Ubiquitous Mobile Host Internetworking," Fourth Workshop on Workstation Operating Systems, pp. 85–90, Oct. 14–15, 1993.

Johnson, David B., "Mobile Host Internetworking Using IP Loose Source Routing," School of Computer Science, Carnegie Mellon University, pp. 1–14 Feb. 1993.

Schoettle, Bob, "IP–Address Management on LANs," Byte, pp. 199–200, Feb. 1996.

Cheshire, Stuart, et al, "Internet Mobility 4×4," Computer Science Department, Stanford University, pp. 1–12, Aug. 1996.

Yeom, Hoen Y., et al., "IP Mutliplexing by Transparent Port–Address Translator," Proceedings of the Tenth USENIX System Administration Conference, pp. 113–122, Sep. 29–Oct. 4, 1996.

Johnson, David B., "Scalable and Robust Internetwork Routing for Mobile Hosts," IEEE Computer Society, pp. 2–11, 1994.

Perkins, Charles, "IMHP: A Mobile Host Protocol for the Internet," Computer Networks and ISDN System, vol. 27, pp. 479–491, 1994.

Proceedings of the IEEE 7th International Workshop on Network and Operating System Support for Digital Audio and Video, Innsbrook Estates Conference Center, May 19–21, 1997, pp. 135–146.

Lucent Technologies, Bell Labs Technical Journal, vol. 2, No. 3, pp. 152–163, Summer 1997.

Lavana, Hemang, et al., Internet–Based Workflows: A Paradigm for Dynamically Reconfigurable Desktop Environments, Group 97, pp. 204–213, 1997.

Perkins, Charles E., et al., "Mobility Support in IPv6," Mobicom 96, pp. 27–37, 1996.

Goldszmidt, German, et al., "ShockAbsorber: A TCP Connection Router," IEEE, Vol. 3, pp. 1919–1923, 1997.

Egevang, K. et al., "The IP Network Address Translator," Network Working Group, pp. 1–10, May 1994.

Manual, "Server and BBS Software for the Packet Radio" by Jean Paul Roubelat, pp. 1–173.

Book, "Internetwork Mobility The CDPD Approach," by Mark S. Taylor, William Waung, and Mohsen Banan, Jun. 11, 1996.

"BlackBerry Technical White Paper," Research In Motion Ltd., Version 1.0, 1998–1999.

Newsletter, "Battery Friendly Bulletin," vol. 1, Issue 3, pp. 1–7 and unnumbered page, 1999.

Article, Comerford, "Handhelds Duke It Out for the Internet," Wireless Internet, pp. 35–38 and 41, Aug. 2000.

Press Detail, "Extended Systems and Motorola Bring Short–Range Wireless to the Paging E–volution," Jan. 13, 2000 (3 pgs.).

Press Detail, "3Com Corporation Licenses Bluetooth Technology from Extended Systems," Feb. 22, 2000 (2 pgs.).

Web Site Article, Hawaleshka, "The Web in Your Pocket," Maclean's, May 15, 2000 (3 pgs.).

Claxton, "Messaging API's for Voice Networks," Telecommunications, pp. 116–120, 1998.

Gifford, David K., et al., "The Application of Digital Broadcast Communication to Large Scale Information Systems," IEEE Journal on Selected Areas in Communications, vol. SAC–3, No. 3, pp. 457–467 (May 1985).

Gifford, David K., et al., "An Architecture for Large Scale Information Systems," ACM, pp. 161–170 (1985).

Sun Microsystems, JavaMail API Design Specification, Version 1.0, Dec. 9, 1997, Sun Microsystems, Inc., chapters 1–10 appendices A–E.

IBM Portable Terminal User's Guide, Third Edition (Jun. 1985).

Binder, Richard et al, The Alohanet Menehune, University of Hawaii, version II (Sep. 1974).

Computer Structures–Principles and Examples, McGraw Hill (1982).

Krebs, Jay, Portable Computer and Host Talk Over Radio–Frequency Link, Electronics, pp. 142–145 (Aug. 25, 1983).

"BlackBerry Technical White Paper," Research In Motion Ltd., Version 1.0, 1989–1999.

Newsletter, "Battery Friendly Bulletin," vol. 1, Issue 3, pp. 1–7 and unnumbered page, 1999.

Article, Comford, "Handhelds Duke It Out for the Internet," Wireless Internet, pp. 35–38 and 41, Aug. 2000.

Press Detail, "Extended Systems and Motorola Bring Short–Range Wireless to the Paging E–volution," Jan. 13, 2000 (3 pgs.).

Press Detail, "3Com Corporation Licenses Bluetooth Technology from Extended Systems," Feb. 22, 2000 (2 pgs.).

Web site Article, Hawaleshka, "The Web in Your Pocket," Maclean's, May 15, 2000 (3 pgs.).

Compaq, Aero 2100 Series Color Palm–size PC Reference Guide, Second Edition, Aug. 1999, Compaq Corporation.

Claxton, "Messaging API's for Voice Networks," Telecommunications, pp. 116–120, 1998.

Gillford, David K., et al., "The Application of Digital Broadcast Communication to Large Scale Information Systems," IEEE Journal on Selected Areas in Communciations, vol. SAC–3, No. 3, pp. 457–467 (May 1985).

Gifford, David K., et al., "An Architecture for Large Scale Information Systems," ACM, pp. 161–170 (1985).

Evevang, K. Et al., "The IP Network Address Translator," Network Working Group, pp. 1–10, May 1994.

Manual, "Server and BBS Software for the Packet Radio" by Jean Paul Roubelat, pp. 1–173.

Book, "Internetwork Mobility The CDPD Approach," by Mark S. Taylor, William Waung, and Mohsen Banan, Jun. 11, 1996.

NewsRelease, "Motorola Rings in 1995 with the Launch of the Macro Wireless communicator," Jan. 4, 1995 (4 pgs.).

Timeline, "FLEX Technology Timeline," (3 pgs.).
News Release, "Motorola Announces Pagewriter 250, The World's Smallest Pager with Full Keyboard", Feb. 27, 1997 (2 pgs.).
Dewey, Barney, "Communications Strategies for Newton 2.0," Newton Technology Journal, p. 10, Jun. 1996.
Press Release, "Motorola Announces New Solutions to Provide Consumers with Wireless Access to Personal and Enterprise E–mail Accounts," Mar. 21, 2001 (4 pgs.).
"Motorola's 'Macro' Wireless Communicator," http:/www.msu.edu/–luckie/gallery/macrom.htm, Jun. 14, 2001 (3 pgs.).
News Release, "CE Software Announces Mobile Vision," Editorial Contacts, CE Software, Inc., 1995 (3 pgs.).
News Release, "CE Software Ships Mobile Vision," Jun. 20, 1995 (3 pgs.).
Newton Reference, Communications, 1996–1997 (4 pgs.).
PC Pro Issue 31: Realworld Computing, PDA Column, Jul. 30, 1997 (7 pgs.).
Enterprise Solutions for Email Overload, Founder Publications, Aug. 6, 2001 (9 pgs.).
"Motorola's 'Macro' Wireless Communicator," http://www.msu.edu/–luckie/gallery/macro.htm, Aug. 6, 2001 (2 pgs.).
Press Release, "Apple Agrees to License Newton Technology to Schlumberger, Digial Ocean," Nov. 3, 1995 (3 pgs.).
Frezza, Bill, "PDA, PDA, Where Art Thou, PDA?", Freewire, Aug. 6, 2001 (5 pgs.).
Black, Lauren, et al., "Personal Digital Assistants," Macworld Reviews, Aug. 6, 2001 (5 pgs.).
Reference, "MobileVision Direct Wireless Connection to Your LAN–Based Electronic Mailbox," CE Software, Inc., pp. 1, 3, 5, 7, 9, 11, 13, 15, 17, 19, 21, 1995.
User Manual, "MobileVision Direct Wireless Connection to Your LAN–Based Electronic Mailbox," CE Software, Inc. 1995.
Johnson, David B., Obiquious Mobile Host Internetworking, Fourth Workshop on workstation Operating Systems, pp. 85–90, Oct. 14–15, 1993.
Johnson, David B., "Mobile Host Internetworking Using IP Loose Source Routing," School of Computer Science, Carnegie Mellon University, pp. 1–14, Feb. 1993.
Schoettle, Bob, "IP–Address Management on LANs," Byte, pp. 199–200, Feb. 1996.
Cheshire, Stuart, et al., "Internet Mobility 4x4," Computer Science Department, Stanford University, pp. 1–12, Aug. 1996.
Yeom, Hoen Y., et al., "IP Multiplexing by Transparent Port–Address Translator," Proceedings of the Tenth USENIX System Administration Conference, pp. 113–122, Sep. 29–Oct. 4, 1996.
Johnson, David B., "Scalable and Robust Internetwork Routing for Mobile Hosts," IEEE Computer Society, pp. 2–11, 1994.
Perkins, Charles, "IMHP: A Mobile Host Protocol for the Internet," Computer Networks and ISDN System, vol. 27, pp. 479–491, 1994.
Perkins, Charles E., et al., "Mobility Support in IPv6," Mobicom 96, pp. 27–37, 1996.
Goldszmidt, German, et al., "ShockAbsorber: A TCP Connection Router," IEEE, vol. 3, pp. 1919–1923, 1997.
Feibus, "A Desktop In Your Palm", Informationweek, Aug. 25, 1997, pp. 65ff.

Behr, "Handheld Solutions", Informationweek, Oct. 27, 1997, pp. 106–113.
DTS Wireless Website located at D.R.L. http://www.dtswireless.com.
"3Com PalmPilot Gets Wireless Link for E–Mail", Spooner, Jogn G., PC Week, Dec. 8, 1997.
"Have Your Pager Call My Pager", Sullivan, Kristina B., PC Week, Dec. 8, 1997.
Gadol, Steve, et al., "Nomadic Tenets–A User's Perspective," Sun Microsystems Laboratories, Inc., pp. 1–16 (Jun. 1994).
Declaration of David A. Keeney regarding SAM System, pp. 1–33 (Sep. 3, 2002).
"SAM integrates E–mail, Alpha Paging, Fax, and More!", SAM System for Automated Messages (10 pgs.).
SAMpage Manual, version 2.0, TeckNow! (Feb. 1990).
Reiter, Alan A., "Focus on Technology," Telocator (Jan. 1990) (4 pgs.).
Kuehn, Carl, "More than Email," Southwest Computer & Business Equipment Review, vol. VII, No. 2, (Feb. 1990) (1 pg.).
SAM System for Automated Messages User's Manual (1988) (17 pgs.).
Motorola Operating Instructions for Your "PMR 2000" Series Display Radio Pages Personal Message Center (2000) (7 pgs.).
Motorola PMR 2000 Personal Message Receiver POSAG (CCIR Radio Paging Code #1) (1986) (6 pgs.).
SAM Reference Manual, System for Automated Messages (Sep. 1989).
Briere, Daniel et al., "One Mailbox, Just Like Old Times", Network World, vol. 14, issue 16, p. 21 (Apr. 21, 1997).
Mosher, Microsoft Exchange User's Handbook, Duke Press, 1997, pp. 547–549.
Kramer, Matt, "Wireless E–mail services gain Windows clients", PC Week, Apr. 17, 1995, v12, n15.
Arnum, Eric, "the universal mailbox arrives . . . soft of", Business Communications Review, May 1996, v26, n5.
Moody's Investors Sevice, Socket Communications Inc.–History & Debt, Investex Report No. 3240276, Feb. 1998.
Newsletter, E–Mail Merges with Voice Through Infinite Technologies, Voice Technology & Services News, May 26, 1998.
Newsletter, VoDAPAGE: Vodapage demos increasing convergence of pagers and mobile communications at TMA 29, M2 Presswire, Nov. 28, 1996.
Takahashi et al., "Communication Method with Data Compression and Encryption for Mobile Computing Environment," Inet 96 Proceedings, 1996, from www.isoc.org/inet96/preceedings/a6/a6_2htm, pp. 1–8.
United States District Court, Northern District of California, San Francisco Division: Good Technology, Inc. V. Research in Motion, Ltd., et al., Case No. C02–2348 MJJ, Plantiff Good Technology, Inc.'s Preliminary Invalidity Contentions Pursuant to Patent L.R. 3–3 and Response Under Patent L.R. 3–4, Jan. 16, 2004, 33 pages.
Perkins, C. : "RFC 2002–IP Mobility Support," IBM, Oct. 1996, 61 pages.

Dawson, F., et al.: "Calender Message–Based Interoperability Protocol (imIP)," Standards Track, RFC 2447, iMIP, Nov. 1998, 4 pages, XP–002249002.

Nelson, M.: "Wireless Data Sevices: Here and Now," PDA Developers 2.6, Nov./Dec. 1994, 3 pages.

14th International Conference on Distributed Computing Systems, Poznan Poland, Jun. 21–24, 1994.

* cited by examiner

NOTIFICATION SYSTEM AND METHOD FOR A MOBILE DATA COMMUNICATION DEVICE

CROSS REFERENCE TO RELATED APPLICATION

This application is a continuation-in-part of U.S. utility application Ser. No. 09/087,623, entitled System and Method for Pushing Information from a Host System to a Mobile Data Communication Device, filed May 29, 1998, and assigned to the assignee of the present invention, now U.S. Pat. No. 6,219,694.

BACKGROUND OF THE INVENTION

The present invention is directed toward the field of notifications for a mobile communications device.

The mobile data communication device is preferably coupled to the host system via a wireless network and one or more landline networks. Due to the bandwidth limitations of wireless networks, only a portion of a user-selected data item is generally redirected to the user's mobile device, with the user given the option of then retrieving the entire data item (or some other portion of the data item) from the host system.

Instead of warehousing (or storing) the user's data items at the host system and then "synchronizing" the mobile data communication device to data items stored at the host system when the mobile device requests that such items of information be communicated to it, the present invention employs a "push" paradigm that continuously packages and retransmits the user-selected items of information to the mobile data communication device in response to a triggering event detected at the host system. Wireless mobile data communications devices, especially those that can return a confirmation signal to the host that the pushed data has been received are especially well suited for this type of push paradigm.

Present systems and methods for replicating information from a host system to a user's mobile data communication device are typically "synchronization" systems in which the user's data items are warehoused (or stored) at the host system for an indefinite period of time and then transmitted in bulk only in response to a user request. In these types of systems and methods, when replication of the warehoused data items to the mobile device is desired, the user typically places the mobile device in an interface cradle that is electrically connected to the host system via some form of local, dedicated communication, such as a serial cable or an infrared or other type of wireless link. Software executing on the mobile data communication device then transmits commands via the local communications link to the host system to cause the host to begin transmitting the user's data items for storage in a memory bank of the mobile device. In these synchronization schemes, the mobile unit "pulls" the warehoused information from the host system in a batch each time the user desires to replicate information between the two devices. Therefore, the two systems (host and mobile) only maintain the same data items after a user-initiated command sequence that causes the mobile device to download the data items from the host system. A general problem with these synchronization systems is that the only time that the user data items are replicated between the host system and the mobile data communication device is when the user commands the mobile device to download or pull the user data from the host system. Five minutes later a new message could be sent to the user, but the user would not receive that message until the next time the user fetches the user data items. Thus, a user may fail to respond to an emergency update or message because the user only periodically synchronizes the system, such as once per day. Other problems with these systems include: (1) the amount of data to be reconciled between the host and the mobile device can become large if the user does not "synchronize" on a daily or hourly basis, leading to bandwidth difficulties, particularly when the mobile device is communicating via a wireless packet-switched network; and (2) reconciling large amounts of data, as can accrue in these batch-mode synchronization systems, can require a great deal of communication between the host and the mobile device, thus leading to a more complex, costly and energy-inefficient system. A more automated, continuous, efficient and reliable system of ensuring that user data items are replicated at the user's mobile device is therefore needed.

The user's mobile device is in many instances removably stored in a holster that is detachably connected to the user's belt or other piece of clothing. Traditionally, upon the detection of a new data item, an audible signal and/or the vibration of the device is the form of notification provided to the user. Such traditional notification is problematic at best and do not provide the user any flexibility for rapid decision-making. A heavy user of the system and method for pushing information from a host to a mobile communication device disclosed herein is quickly overcome with persistent data item notification during the busiest time periods in a business day. After receiving a traditional notification, the user reaches for his mobile device in the holster to examine the displayed data item associated with the notification. Frequent traditional notifications can become annoying to a heavy user; thereby causing the user to switch off the audible and/or vibrate notifications all together.

Traditional mobile communication devices, which implement the system and method of pushing information from a host as described herein, also lack the facility of an assistant or secretary to screen pages, emails, voice mails, etc. that arrive at the mobile communication device. In many ways, more work is created for the user when using such a device because a form of wireless umbilical cord extends from the user's host system to the user via the mobile communication device without the facility of a secretary or assistant to manage and/or screen the notifications. The user cannot differentiate unimportant data item notifications from those data items that are relevant or very important without having to commit to the physical action of reviewing the display of the device. An additional feature of the present invention is that the push paradigm, in combination with a return communications pathway, lends itself well to a system that permits a user to control remotely, through the user's mobile device, a number of aspects of the host system.

There remains a general need in this art for a system and method of continuously pushing user-selected data items (or certain portions of the selected data items) stored at a host system to a user's mobile data communication device.

There remains a more particular need for such a system and method where user-selected data items are continuously "pushed" from the host system to the mobile data communication device upon the occurrence of one or more user-defined triggering events.

There remains an additional need for such a system and method that provides flexibility in the types and quantities of user data items that are pushed from the host system to the mobile data communication device and that also provides flexibility in the configuration and types of events that can serve to trigger the redirection of the user data items.

There remains yet an additional need for such a system and method that can operate locally on a user's desktop PC or at a distance via a network server.

There remains still another need for such a system and method that provides for secure, transparent delivery of the user-selected data items from the host system to the mobile device.

There remains still another need for such a system and method that provides for notification in a user-selectable manner of user-selectable data items arriving at the mobile device.

There remains yet another need for such a system and method that provides for notification of mobile-specific event occurrences such as, but not limited to calendar event reminders and unsuccessful transmission of user data items originating from the mobile device.

There also remains still another need for such a system and method that provides for notification of user-selected data items from the host system to the mobile device in a userselectable manner that allows the user of the mobile communication device the quick and hands-free ability to determine whether or not to act on a notification.

There also remains yet another need to integrate secretarial-like features into a mobile communication device using the system and method of pushing information from a host to a mobile communication device.

SUMMARY OF THE INVENTION

The present invention overcomes the problems noted above and satisfies the needs in this field for a system and method of pushing user-selected data items from a host system to a user's mobile data communication device upon detecting the occurrence of one or more user-defined event triggers. As used in this application, the term host system refers to the computer where the redirector software is operating. In the preferred embodiment of the present invention, the host system is a user's desktop PC, although, alternatively, the host system could be a network server connected to the user's PC via a local-area network ("LAN"), or could be any other system that is in communication with the user's desktop PC.

According to the present invention a system and method is provided such that an event-driven redirection computer program ("redirector program") operating at the host system, which, upon sensing a particular user-defined event has occurred, characterizes user-selected data items and then redirects them from the host system to the user's mobile data communication device. s Upon arrival of the user-selected data items at the mobile data communication device, the present invention notifies the user in a user-selectable manner. In addition to the arrival of data items on the device, the occurrence of certain events that are specific to the mobile communication device and the transmission status of data items are events that are within the scope of the invention to notify the user.

A redirector program operating at the host system enables the user to redirect or mirror certain user-selected data items (or parts of data items) from the host system to the user's mobile data communication device upon detecting that one or more user-defined triggering events has occurred. Also operating at the host system are various sub-systems that can be configured to create triggering events, such as a screen saver sub-system or a keyboard sub-system, as well as sub-systems for repackaging the user's data items for transparent delivery to the mobile data device, such as a TCP/IP sub-system or one or more E-Mail sub-systems. Other sub-systems for creating triggering events and repackaging the user's data items could also be present at the host system. The host system also includes a primary memory store where the user's data items are normally stored.

Using the redirector program, the user can select certain data items types for redirection, such as E-mail messages, calendar events, meeting notifications, address entries, journal entries, personal reminders etc. Having selected the data items for redirection, the user can then configure one or more event triggers to be sensed by the redirector program to initiate redirection of the user data items. These user-defined trigger points (or event triggers) include external events, internal events and networked events. Examples of external events include: receiving a message from the user's mobile data communication device to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the examples of the types of user-defined events that can trigger the redirector program to push data items from the host to the mobile device. Although in the preferred embodiment it is anticipated that the configuration that specifies which data items will be redirected and in what form will be set at the host system, it is within the scope of this invention that such configuration may be set or modified through data sent from the mobile communications device.

In addition to the functionality noted above, the redirector program provides a set of software-implemented control functions for determining the type of mobile data communication device and its address, for programming a preferred list of message types that are to be redirected, and for determining whether the mobile device can receive and process certain types of message attachments, such as word processor or voice attachments. The determination of whether a particular mobile device can receive and process attachments is initially configured by the user of that mobile device at the host system. This configuration can be altered on a global or per message basis by transmitting a command message from the mobile device to the host system. If the redirector is configured so that the mobile data device cannot receive and process word processor or voice attachments, then the redirector routes these attachments to an external machine that is compatible with the particular attachment, such as an attached printer or networked fax machine or telephone. Other types of attachments could be redirected to other types of external machines in a similar fashion, depending upon the capabilities of the mobile device. For example, if a user is traveling and receives a message with an attachment that the user's mobile device can process or display, the user may from a mobile communications device send a command message to the host system indicating that attachment is to be sent to a fax machine at a hotel where the user will be spending the evening. This enables the user to receive important E-mail attachments as long as the host system is provided with sufficient information about the destination where the attachment is to be forwarded.

Once an event has triggered redirection of the user data items, the host system then repackages these items in a manner that is transparent to the mobile data communication device, so that information on the mobile device appears similar to information on the user's host system. In one embodiment of the present invention, the repackaging of these items includes characterizing the data item type and the priority ranking associated therewith. As discussed above, data item types preferably include E-mail messages, calendar events, meeting notifications, address entries, journal entries, personal reminders, instant email notifications, etc. Priority rankings preferably include regular importance, very important and emergency. It is to be understood that it is clearly within the scope of the invention to expand or decrease the levels of priority rankings in an alternative embodiment of the invention. By characterizing the data item, the mobile data communication device can act on the characterization according to the user-selectable notification scheme as set forth on the mobile device, or alternatively as set forth on the host system. The preferred repackaging method includes wrapping the user data items in an E-mail envelope that corresponds to the address of the mobile data communication device, although, alternatively, other repackaging methods could be used with the present invention, such as special-purpose TCP/IP wrapping techniques, or other methods of wrapping the user selected data items. The repackaging preferably results in E-mail messages generated by the user from the mobile device to be transmitted from the host system, thus enabling the user to appear to have a single E-mail address, such that the recipients of messages sent from the mobile communications device do not know where the user was physically located when the message was first sent. The repackaging also permits both messages to the mobile device and sent from the mobile device to be encrypted and decrypted as well as compressed and decompressed.

In an alternative system and method, the redirector program executes on a network server, and the server is programmed to detect numerous redirection event triggers over the network from multiple user desktop computers coupled to the server via a LAN. The server can receive internal event triggers from each of the user desktops via the network, and can also receive external event triggers, such as messages from the users' mobile data communication devices. In response to receiving one of these triggers, the server redirects the user's data items to the proper mobile data communication device. The user data items and addressing information for a particular mobile device can be stored at the server or at the user's PC. Using this alternative configuration, one redirector program can serve a plurality of users. This alternative configuration could also include an internet- or intranet-based redirector program that could be accessible through a secure webpage or other user interface. The redirector program could be located on an Internet Service Provider's system and accessible only through the Internet. An example of an Internet-based redirector program can allow various Internet-based email and calendar event information companies to redirect their user data items to a particular mobile device. Instant message notifications are one such type of data items that would fall into this category.

In a preferred embodiment of the present invention, a client-based software program operates at the mobile communication device to manage and execute the user-selectable notification scheme ("notification module"). Preferably, the notification module is a component of the primary client software program residing on the mobile device that manages the redirected data items arriving and departing therefrom. In the preferred embodiment, the notification module is called upon on or before presenting any information on the display of the mobile device that is the result of a (1) data item arriving onto the mobile device from the wireless network, (2) data item event reminder, or (3) data item transmission status report. Collectively, these examples and others like them are herein referred to as "notifiable data items".

In another alternative configuration of the present invention, a redirector program operates at both the host system and at the user's mobile data communication device. In this configuration, the user's mobile device operates similarly to the host system described below, and is configured in a similar fashion to push certain user-selected data items from the mobile device to the user's host system (or some other computer) upon detecting an event trigger at the mobile device. This configuration provides two-way pushing of information from the host to the mobile device and from the mobile device to the host.

The primary advantage of the present invention is that it provides a system and method for triggering the continuous and real-time redirection of user-selected data items from a host system to a mobile data communication device with user-selectable notification of the data items at the device. Other advantages of the present invention include: (1) flexibility in defining the types of user data to redirect, and in defining a preferred list of message types that are to be redirected or preferred senders whose messages are to be redirected; (2) flexibility in configuring the system to respond to numerous internal, external and networked triggering events; (3) transparent repackaging of the user data items in a variety of ways such that the mobile data communication device appears as though it were the host system; (4) integration with other host system components such as E-mail, TCP/IP, keyboard, screen saver, webpages and certain programs that can either create user data items or be configured to provide trigger points; (5) the ability to operate locally on a user's desktop system or at a distance via a network server; (6) flexibility in defining a user-selectable notification scheme to notify the user; (7)provides for notification in a user-selectable manner of user-selectable data items arriving at the mobile device; (8) provides for notification of mobile-specific event occurrences such as, but not limited to calendar event reminders and unsuccessful transmission of user data items originating from the mobile device; (9) provides for notification of user-selected data items from the host system to the mobile device in a user-selectable manner that allows the user of the mobile communication device the quick and hands-free ability to determine whether or not to act on a notification; and, (10) provides for integrated secretarial-like features into the mobile communication device. These are just a few of the many advantages of the present invention, as described in more detail below. As will be appreciated, the invention is capable of other and different embodiments, and its several details are capable of modifications in various respects, all without departing from the spirit of the invention. Accordingly, the drawings and description of the preferred embodiments set forth below are to be regarded as illustrative in nature and not restrictive.

BRIEF DESCRIPTION OF THE DRAWINGS

The present invention satisfies the needs noted above as will become apparent from the following description when read in conjunction with the accompanying drawings wherein.

DETAILED DESCRIPTION OF THE DRAWINGS

Figure 1:
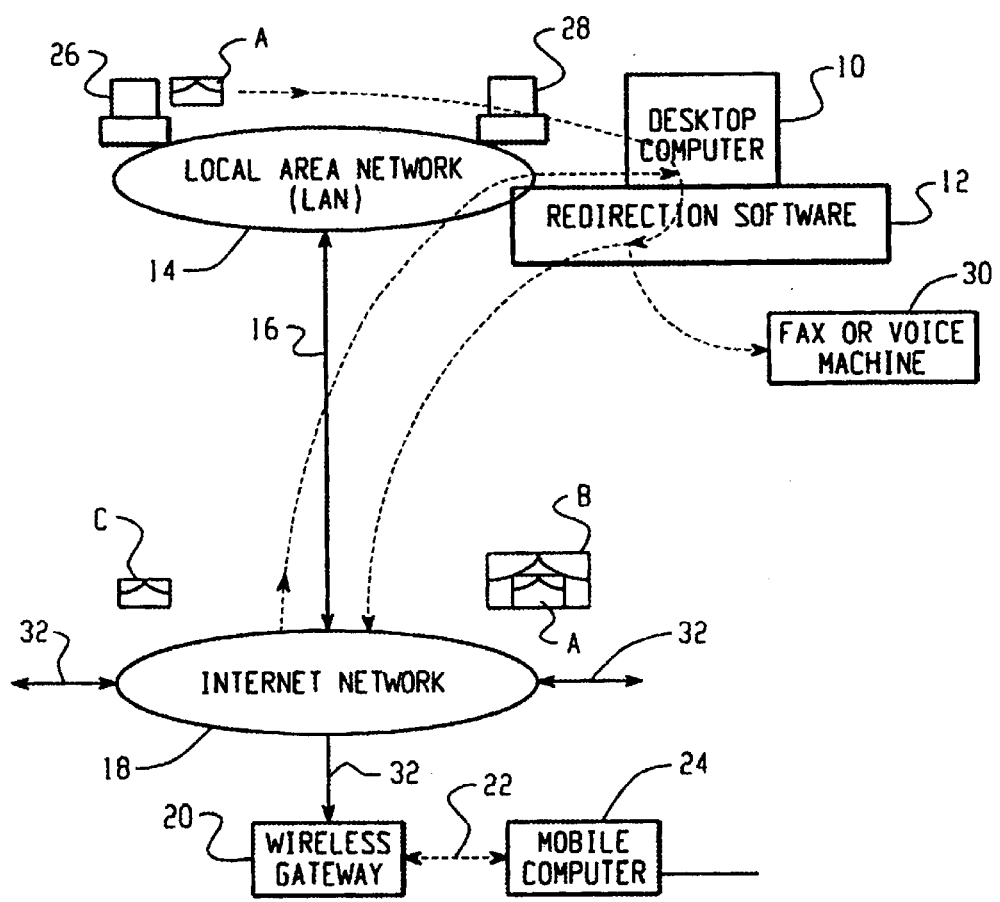
FIG. 1 is a system diagram showing the redirection of user data items from a user's desktop PC (host system) to the user's mobile data communication device, where the redirector software is operating at the user's desktop PC.

Referring now to the drawings, FIG. 1 is an example system diagram showing the redirection of user data items (such as message A or C) from a user's office PC (host system) 10 to the user's mobile data communication device 24, where the redirector software 12 is operating at the user's PC. Message A in FIG. 1 represents an internal message sent from desktop 26 to the user's host system 10 via LAN 14. Message C in FIG. 1 represents an external message from a sender that is not directly connected to LAN 14, such as the user's mobile data communication device 24, some other user's mobile device (not shown), or any user connected to the Internet 18. Message C also represents a command message from the user's mobile data communication device 24 to the host system 10. As described in more detail in FIG. 3, the host system 10 preferably includes, along with the typical hardware and software associated with a workstation or desktop computer, the redirector program 12, a TCP/IP subsystem 42, a primary message store 40, an E-mail subsystem 44, a screen saver subsystem 48, and a keyboard subsystem 46.

In FIG. 1, the host system 10 is the user's desktop system, typically located in the user's office. The host system 10 is connected to a LAN 14, which also connects to other computers 26, 28 that may be in the user's office or elsewhere. The LAN 14, in turn, is connected to a wide area network ("WAN") 18, preferably the Internet, which is defined by the use of the Transmission Control Protocol/Internet Protocol ("TCP/IP") to exchange information, but which, alternatively could be any other type of WAN. The connection of the LAN 14 to the WAN 18 is via high bandwidth link 16, typically a T1 or T3 connection. The WAN 18 in turn is connected to a variety of gateways 20, via connections 32. A gateway forms a connection or bridge between the WAN 18 and some other type of network, such as an RF wireless network, cellular network, satellite network, or other synchronous or asynchronous land-line connection.

In the example of FIG. 1, a wireless gateway 20 is connected to the Internet for communicating via wireless link 22 to a plurality of wireless mobile data communication devices 24. Also shown in FIG. 1 is machine 30, which could be a FAX machine, a printer, a system for displaying images (such as video) or a machine capable of processing and playing audio files, such as a voice mail system. The present invention includes the ability to redirect certain message attachments to such an external machine 30 if the redirector program configuration data reflects that the mobile device 24 cannot receive and process the attachments, or if the user has specified that certain attachments are not to be forwarded to mobile device 24, even if such device can process those attachments. By way of example, consider an E-mail sent to a user that includes three attachments—a word processing document, a video clip and an audio clip. The redirection program could be configured to send the text of the E-mail to the remote device, to send the word processing document to a networked printer located near the user, to send the video clip to a store accessible through a secure connection through the internet and to send the audio clip to the user's voice mail system. This example is not intended to limit the breadth and scope of the invention, but rather to illustrate the variety of possibilities embodied in the redirection concept.

Figure 4:
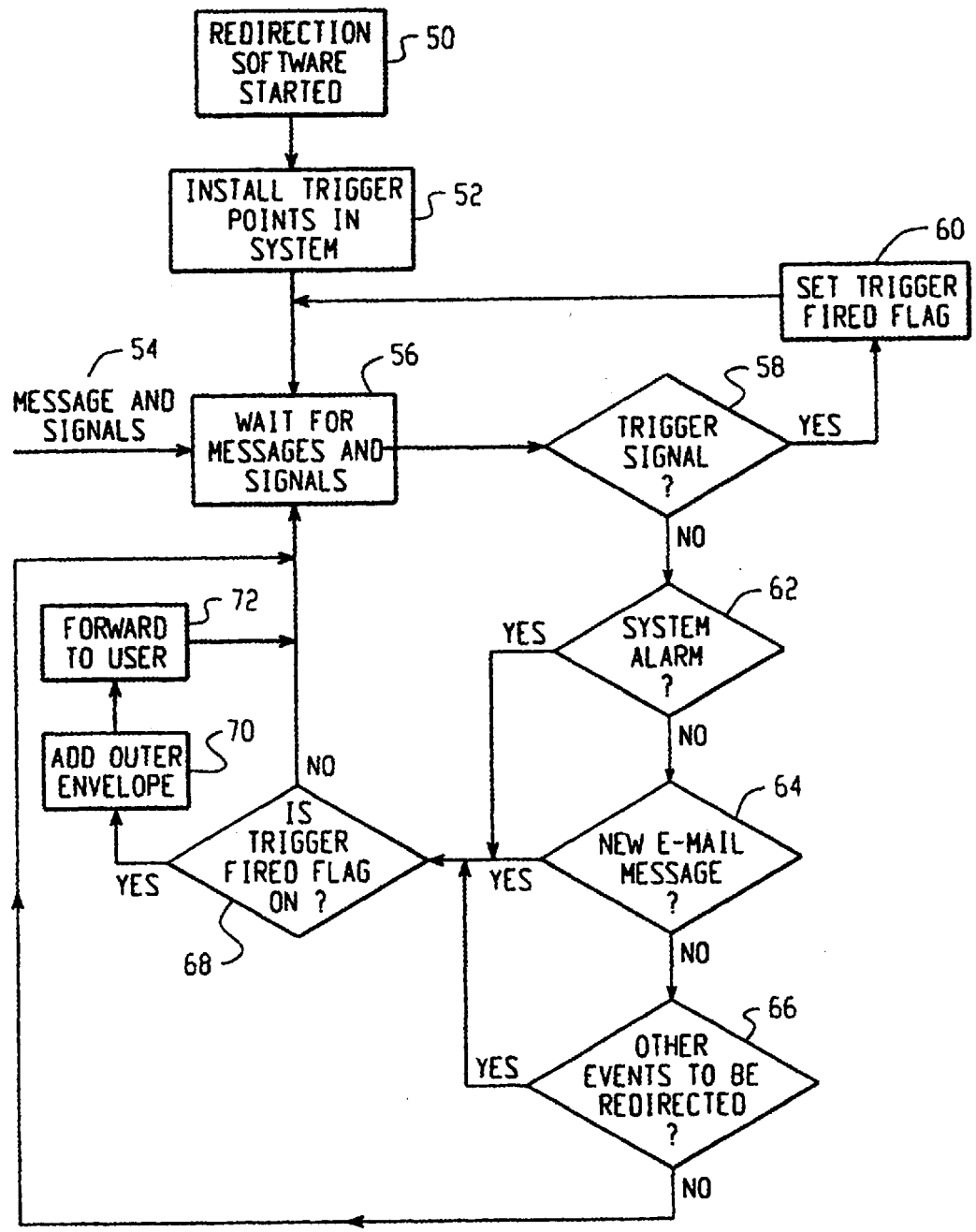
FIG. 4 is a flow chart showing the steps carried out by the redirector software operating at the host system.

The preferred mobile data communication device 24 is a hand-held two-way wireless paging computer, a wirelessly enabled palm-top computer, a mobile telephone with data messaging capabilities, or a wirelessly enabled laptop computer, but could, alternatively be other types of mobile data communication devices capable of sending and receiving messages via a network connection 22. Although it is preferable for the system to operate in a two-way communications mode, certain aspects of the invention could be beneficially used in a "one and one-half" or acknowledgment paging environment, or even with a one-way paging system. The mobile data communication device 24 includes software program instructions that work in conjunction with the redirector program 12 to enable the seamless, transparent redirection of user-selected data items. FIG. 4 describes the basic method steps of the redirector program 12, and FIG. 5 describes the steps of the corresponding program operating at the mobile device 24.

In an alternative embodiment of the present invention, not explicitly shown in the drawings, the mobile device 24 also includes a redirector program. In this embodiment, user selected data items can be replicated from the host to the mobile device and vice versa. The configuration and operation of the mobile device 24 having a redirector program is similar to that described herein with respect to FIGS. 1–4.

A user of the present invention can configure the redirector program 12 to push certain user-selected data items to the user's mobile data communication device 24 when the redirector 12 detects that a particular user-defined event trigger (or trigger point) has taken place. Userselected data items preferably include E-mail messages, calendar events, meeting notifications, address entries, journal entries, personal alerts, alarms, warnings, stock quotes, news bulletins, etc., but could, alternatively, include any other type of message that is transmitted to the host system 10, or that the host system 10 acquires through the use of intelligent agents, such as data that is received after the host system 10 initiates a search of a database or a website or a bulletin board. In some instances, only a portion of the data item is transmitted to the mobile device 24 in order to minimize the amount of data transmitted via the wireless network 22. In these instances, the mobile device 24 can optionally send a command message to the host system to receive more or all of the data item if the user desires to receive it.

Among the user-defined event triggers that can be detected by the redirector program 12 are in the preferred embodiment external events, internal events and networked events. External events preferably include: (1) receiving a command message (such as message C) from the user's mobile data communication device to begin redirection, or to execute some other command at the host, such as a command to enable the preferred list mode, or to add or subtract a particular sender from the preferred list; (2) receiving a similar message from some external computer; and (3) sensing that the user is no longer in the vicinity of the host system; although, alternatively, an external event can be any other detectable occurrence that is external to the host system. Internal events could be a calendar alarm, screen saver activation, keyboard timeout, programmable timer, or any other user-defined event that is internal to the host system. Networked events are user-defined messages that are transmitted to the host system from another computer coupled to the host system via a network to initiate redirection. These are just some of the events that could be used with the present invention to initiate replication of the user-selected data items from the host system 10 to the mobile device 24.

FIG. 1 shows an E-mail message A being communicated over LAN 14 from computer 26 to the user's desktop system 10 (also shown in FIG. 1 is an external message C, which could be an E-mail message from an Internet user, or could be a command message from the user's mobile device 24). Once the message A (or C) reaches the primary message store of the host system 10, it can be detected and acted upon by the redirection software 12. The redirection software 12 can use many methods of detecting new messages. The preferred method of detecting new messages is using Microsoft's® Messaging API (MAPI), in which programs, such as the redirector program 12, register for notifications or 'advise syncs' when changes to a mailbox take place. Other methods of detecting new messages could also be used with the present invention.

Assuming that the redirector program 12 is activated, and has been configured by the user (either through the sensing of an internal, network or external event) to replicate certain user data items (including messages of type A or C) to the mobile device 24, when the message A is received at the host system 10, the redirector program 12 detects its presence and prepares the message for redirection to the mobile device 24. In preparing the message for redirection, the redirector program 12 could compress the original message A, could compress the message header, or could encrypt the entire message A to create a secure link to the mobile device 24.

Also programmed into the redirector 12 is the address of the user's mobile data communication device 24, the type of device, and whether the device 24 can accept certain types of attachments, such as word processing or voice attachments. If the user's type of mobile device cannot accept these types of attachments, then the redirector 12 can be programmed to route the attachments to a fax or voice number where the user is located using an attached fax or voice machine 30.

The redirector may also be programmed with a preferred list mode that is configured by the user either at the host system 10, or remotely from the user's mobile data communication device by transmitting a command message C. The preferred list contains a list of senders (other users) whose messages are to be redirected or a list of message characteristics that determine whether a message is to be redirected. If activated, the preferred list mode causes the redirector program 12 to operate like a filter, only redirecting certain user data items based on whether the data item was sent from a sender on the preferred list or has certain message characteristics that if present will trigger or suppress redirection of the message. In the example of FIG. 1, if desktop system 26 was operated by a user on the preferred list of host system 10, and the preferred list option was activated, then message A would be redirected. If, however, desktop 26 was operated by a user not on the host system's preferred list, then message A would not be redirected, even if the user of the host system had configured the redirector to push messages of type A. The user of the host system 10 can configure the preferred list directly from the desktop system, or, alternatively, the user can then send a command message (such as C) from the mobile device 24 to the desktop system 10 to activate the preferred list mode, or to add or delete certain senders or message characteristics from the preferred list that was previously configured. It should be appreciated that a redirection program could combine message characteristics and preferred sender lists to result in a more finely-tuned filter. Messages marked as low priority or that are simple return receipts or message read receipts, for example, could always be suppressed from redirection while messages from a particular sender would always be redirected.

In yet another aspect of the present invention, a description of the notification system and method is now further described. In general, each data item that is redirected to the mobile preferably is characterized as to the data item type and the priority ranking associated therewith. Data item types preferably include E-mail messages, calendar events, meeting notifications, address entries, journal entries, personal reminders, instant email notifications, etc. Priority rankings preferably include at least three different levels of importance, namely regular importance, very high importance and emergency. It is to be understood that it is clearly within the scope of the invention to expand or decrease the levels of priority rankings in an alternative embodiment of the invention. By characterizing the-data-item, the mobile data communication device can act on the characterization according to a user-selectable notification scheme. In addition to the user-selectable notification scheme, the mobile preferably executes a variety of secretary-like actions. The collective features of the present invention provide the mobile the ability to advantageously operate very much like a virtual secretary thereby providing many of the aforesaid advantages of the present invention.

Characterization preferably takes place at the host system. In a second embodiment, the characterization may take place at the mobile. In a third embodiment, a first portion of characterization may take place at the host system and a second portion of characterization may take place at the mobile. In this third embodiment, the user can set which of the two characterizations can take precedence (ie. which wins in a conflict). In the preferred embodiment, the characterization as to the type of the data item and as to the priority ranking are undertaken at the host system. However, the user, preferably, may override the host-side characterization settings regarding the priority rankings at the mobile. It is to be understood that it is preferable that the host system and the mobile are initially synchronized at either an initial hard link or via an over-the-air synchronization to match characterization protocols and notification schemes.

By way of example of the characterization process, after step 68 in FIG. 4, the redirector program may characterize the data item with a unique data item type identifier and a unique priority ranking in the header of the data item. The data item type information may be taken from the results of the determinations at steps 62, 64 and 66. Other suitable means of determining the data type are well within the scope of the present invention. Characterization as to the priority ranking of the data item may be accomplished in a number of ways. For instance, a data item software package, such as an email messaging client, may associated priority ranking with outbound email messages. This ranking is generally embedded in the header of the email message. However, solely relying on the sender and/or the sender's software package to embed priority ranking is not desirable for the following reasons: (1) some software packages do not have the ability to characterize the priority associated with the data item or where is the ability priority ranking is not associated with all outgoing data items, (2) the sender does not prioritize the data item as the mobile user desires, (3) the priority rankings created by the sender are in conflict with the user-defined rankings. In the preferred embodiment, the priority ranking is created and incorporated into the data item header by the notification element of the redirector program prior to wrapping the outer envelope, such as at step 70 of FIG. 4. In the preferred embodiment, the filter rules described herein for the redirection of data items from the host system to the mobile device may include priority ranking characterization of data items. In such an instance, the priority ranking may be incorporated into the headers of data items as they successful qualify for redirection to the mobile. Data items may be prioritized according an infinite number of user-selected criteria including but not limited to: sender of the data item; recipients of the data items and, subject of the data item. It is within the scope of the present invention to create a number of other criteria where the priority ranking may differ according to user-selected criteria.

In addition to characterization, the present invention utilizes what is known herein as a "notification scheme". The notification scheme is a plurality of filtering and action rules that are applied to a notifiable data item using some or all of the characterization of the data item. In the preferred embodiment, a set of default rules will be available in the interim for the user until he gets an opportunity to personalize his notification scheme. In the preferred embodiment, there is a plurality of notification schemes on the device, each customizable for the user's benefit. As an example, a first notification scheme may apply only to meeting requests from a certain group of individuals, while a second notification scheme may apply only to the failure of any data items transmitted from the mobile. A third notification scheme may apply to email messages from a certain sender. The infinite variety of combinations will be appreciated with the following description.

The notification scheme provides the user with a plurality of notification alerts such as, but not limited to, audible, visual and vibrating alerts. Continuing with the example, the user would then select whether any reminders are necessary. If so, the user may select the same alert scheme earlier selected or alternatively, choose a different style of reminder. In this manner, the level of intrusion to the user due to the notification may be minimized and yet still be beneficial to the user. To illustrate this point, take for example a calendar event such as a meetings that include party Y are to be audibly alerted, but email message from the same person is just visually alerted.

Figure 6:
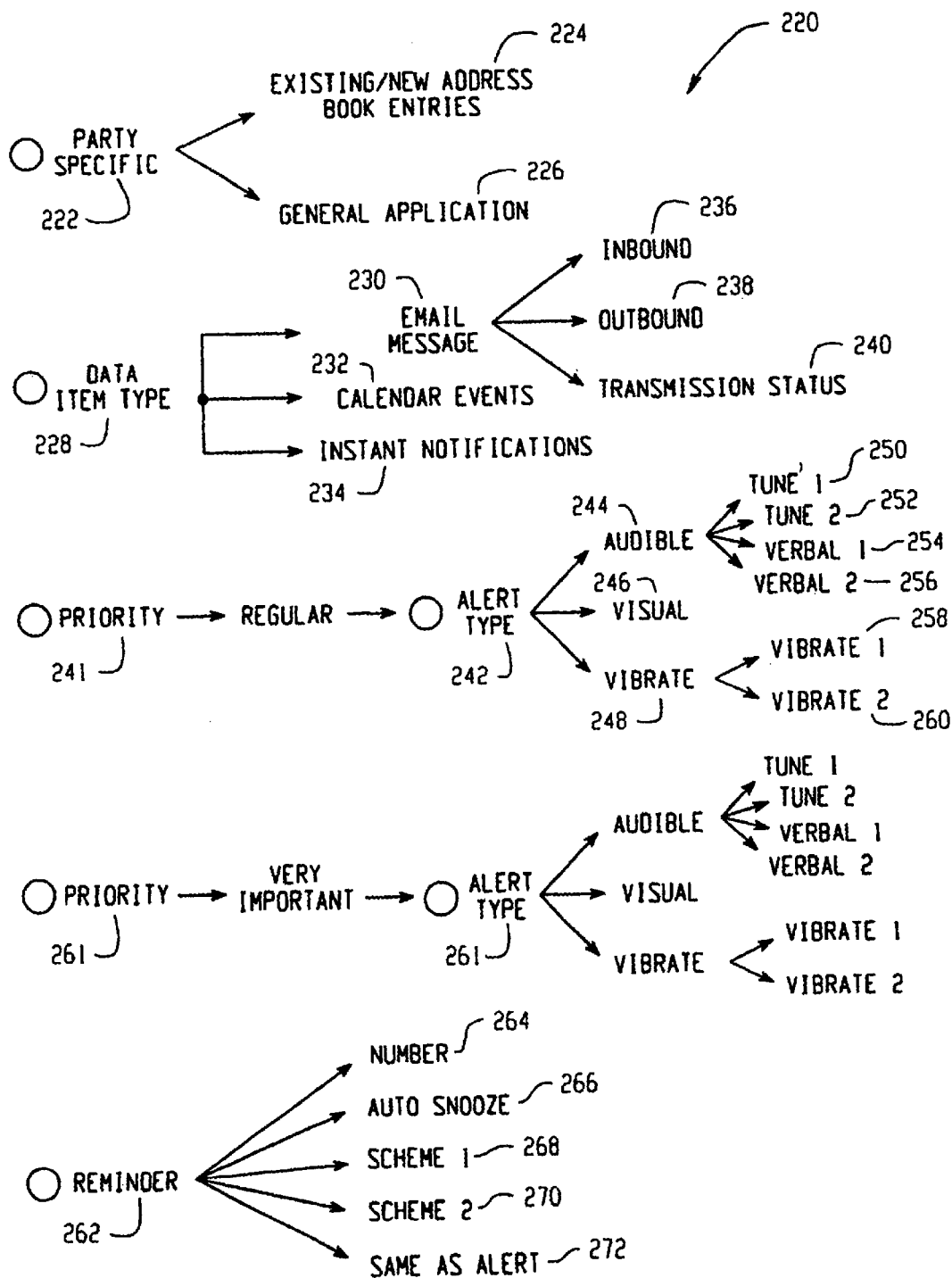
FIG. 6 is illustrative of the variety of notification options for a typical notification scheme available to the user.

FIG. 6 is illustrative of the variety of notification options for a typical notification scheme available to the user. In the preferred embodiment, the user at his mobile will have a notification scheme screen that will intelligently navigate the user through the various options and combinations illustrated in FIG. 6. The reference numerals 222–272 identify some of the user selectable choices available for any one notification scheme. Not all choices are illustrated for brevity sake. In essence, the user is prompted through a first series of restriction criteria. Preferably, some of these restriction criteria would then be further restricted a second series of restriction criteria, if so desired by the user.

As a first step 222, in the notification scheme screen, the user is prompted on whether the current scheme is to be party-specific 224 or to be generally applied 226. When the party-specific option 224 is activated, the notification scheme only applies to certain predetermined individuals or groups of individuals identified in notifiable data items. User may select from pre-existing individuals in the mobile's address book or create new ones. User may then set parameters of where the individual must be identified. For instance, in the preferred embodiment, the user may require that the individual be identified in any number of ways including at least one of: (1) senders of the data items, (2) attendees of calendar events, (3) individuals listed in the cc: of an email message, or (4) recipients of the data items. In the preferred embodiment, a variety of combinations are possible and user-selectable. In the alternative, the user may choose option 226 such that the notification scheme 220 applies generally without reference to the party identified in the notifiable data item.

At step 228, the user is prompted to choose from a plurality of data item types. By choosing at least one of the plurality of data item types 230, 232, 234, the notification scheme is restricted in its applications to those data items types selected. It is preferable that a user restriction selection may initiate the user to further restrict in sub-selections. In this manner, the notification scheme may be more finely tuned. For example, in the preferred embodiment, if the user selects email message 230 as a data item restriction to be applied, the user is further prompted to select from one of at least, preferably, three sub-choices, namely: inbound email messages 236, outbound email messages 238, or transmission status of email messages 240.

As a pre-step before selecting the alert at step 242, the user is prompted as to the priority ranking the data item must have before the alert is executed. Such ranking restriction is designated as steps 241, 261 and 271. Although not fully illustrated in FIG. 6, it is to be understood that the alert selection (steps 242–260) is repeated for each different priority ranking the user selects. Therefore, the user may have a certain alert selection for data items having regular importance, while a completely different alert selection for data items having very high importance. Preferably, however, such subsets of alert selections will be make up only one notification scheme.

At step 242, the user is prompted to choose from a plurality of alert types, including preferably, audible 244, visual 246 and vibrate 248 signals. As illustrated in FIG. 6, the user is provided in the case of an audible signal 244, a plurality of audible variants 250–256. In the case where the user has selected audible signal, the user is given the opportunity to choose from a plurality of tune variants and a plurality of verbal variants. The verbal variants are very useful in the case where the mobile includes a cooperating headset that includes an earpiece. By way of example, a verbal variant may be the spoken name of the sender of the email message. The mobile would audibly present a computer generated verbal announcement of the fact that an email message was received from a particular sender via a speaker in the mobile or via a headset device. In the present invention, notification may be delivered via the mobile device itself and/or an associated headset device. The headset device preferably includes an ear and integrated mouthpiece. In a preferred embodiment, the headset device may have all the notification signal capabilities, but the vibrating signal.

Returning back to FIG. 6, at step 262, the user is prompted to choose from a plurality of reminder features 264–272. Choice 264 relates to the number of times the user is reminded of the notifiable data item with the foregoing user-selected alert. Choice 266 is the auto snooze feature. This feature allows the user to acknowledge an alert in any number of ways such as pulling the mobile of the holster or opening and viewing notifiable data item while at the same returning the mobile to a rest mode such as returning the mobile to the holster, but get reminded of the notifiable data item in a user-selected predetermined time interval. It can be appreciated by those skilled in the art that a wide number of reminder styles are possible, and such styles are within the scope of the invention. The mobile device 24 will reference a user-selectable notification scheme store (not shown) at step 206 to make a determination of whether or not the data item requires notification. If a determination at step 206 results in the affirmative, a series of possible notification types and actions are possible as set forth in steps 208–218. It is to be understood that other notification types and combinations thereof are within the scope of the present invention. The user-selectable notification scheme store will preferably have a default notification scheme that the user may modify. As can be inferred from the description of the present invention, a plurality of combinations may be applied to the notification scheme. Advantageously, the notification rules may be: fine-tuned and very comprehensive so as to allow a user an extremely wide ambit of freedom and control of reviewing notifiable data items. In effect, notification is optimized for the user; thereby creating for the user a virtual secretary at the mobile device.

Virtual Secretary

The virtual secretary may be invoked in a number of ways. For example, a message arrives having an emergency ranking, the mobile notifies the user accordingly, the users reviews the message, upon cursoring to the end of the message, software on the mobile either (1) prompts the user to reply to the sender, or (2) opens a new message to reply to the sender. In this manner, time which may be of the essence is advantageously saved and navigation through GUIs are avoided for a response.

To further illustrate another feature of the virtual secretary described in the present invention, take for example, an attachment to an email message arrives at the handheld that is not openable or viewable at the mobile. In one embodiment of the present invention, the mobile device will upon or while contemporaneously acting on the user-selected notification scheme will locate a suitable peripheral or other device that will allow the attachment to be presented to the user. More specifically, the software on the mobile will, upon detection of an attachment not presentable to the user, automatically wirelessly transmit an attachment agent from the handheld through a cooperating wireless LAN or WAN. The attachment agent will seek and locate a peripheral or device that is willing and capable to open and present the attachment for the user. The agent will use a variety of user-selectable parameters to determine the most suitable external device to present the attachment. Such parameters include what will constitute a reasonable distance for the user to walk (i.e anywhere on the same floor of an office building, but no further than 250 metres). Upon successfully seek and locate, the agent will return to the device, or alternatively, some form of acknowledgment will be reported to the mobile about the opportunity and details regarding logistics to present the attachment to the user. At that time the user can choose to either view the attachment at the suggested external device or ignore the same.

Ambient Noise Detection

Figure 8:
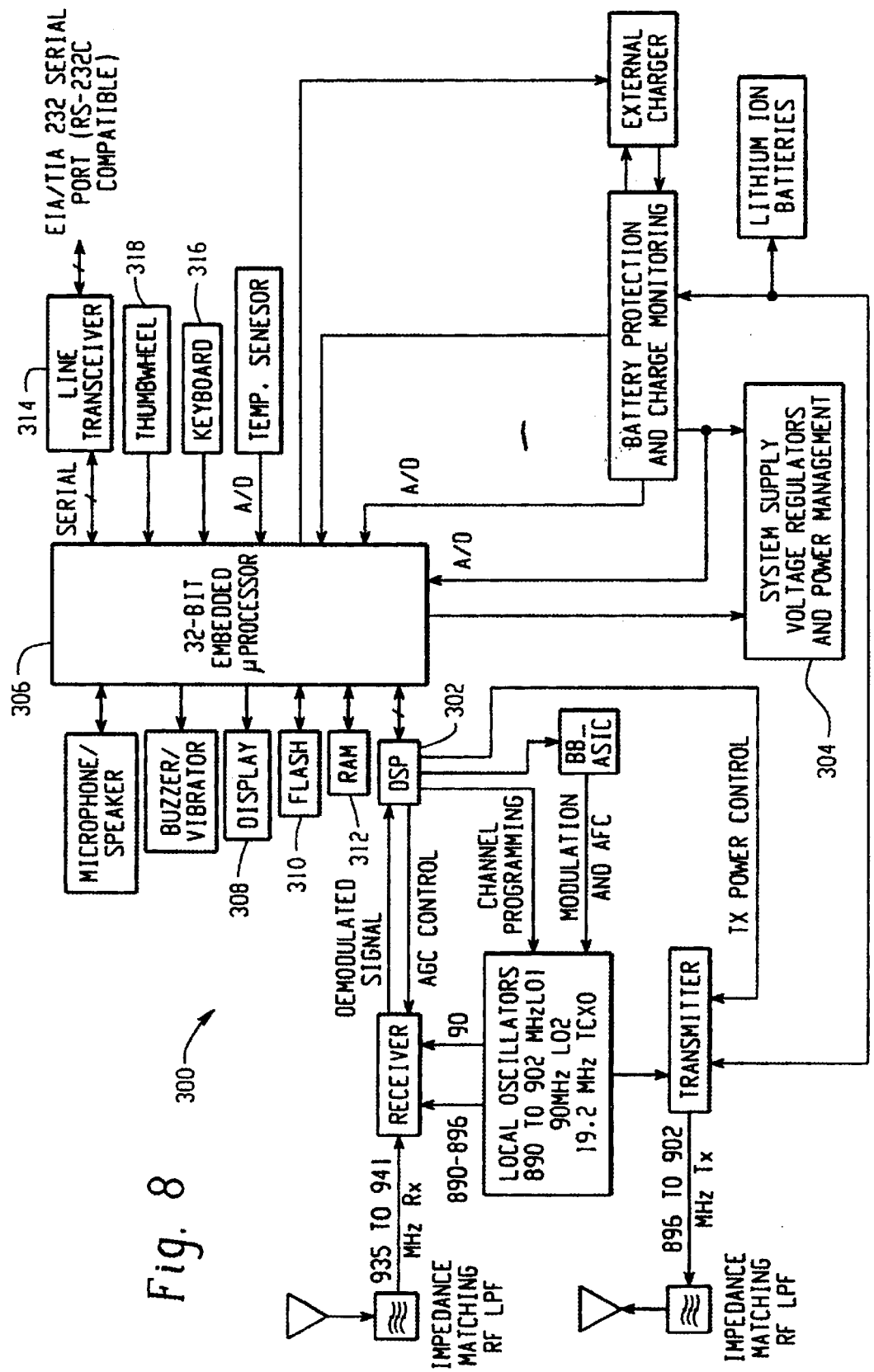
FIG. 8 is a block diagram of the major subsystems and elements comprising a palm-sized, mobile, two-way messaging device 24 that preferably incorporates the invention

In another embodiment of the present invention, the mobile modifies the audible alert of notifiable data-items according to the noise level around the user. FIG. 8 is a block diagram of the major subsystems and elements comprising a palm-sized, mobile, two-way messaging device 24 that preferably incorporates the invention. In this embodiment, the device prior to notifying the user of a notifiable data item carries through with the following additional steps: (1) detecting the ambient noise, (2) measuring the ambient noise, (3) determining whether to adjust the volume level associated with notification, (4) if adjustment is required, adjusting the volume of audible signal accordingly. Naturally, the ambient noise detection routine is only executed where there is an audible signal associated with the notification. In its broadest terms, the messaging device 24 includes a transmitter/receiver subsystem 300 connected to a digital signal processor (DSP) 302 for digital signal processing of the incoming and outgoing data transmissions, power supply and management subsystem 304, which supplies and manages power to the overall messaging device components, microprocessor 306, which is preferably an X86 architecture processor, that controls the operation of the messaging device, display 308, which is preferably a full graphic LCD, FLASH memory 310, RAM 312, serial input and output 314, keyboard 316, thumbwheel 318 and thumbwheel control logic (not shown). In its intended use, a message comes via a wireless data network into subsystem 306, where it is demodulated via DSP 302 and decoded and presented to microprocessor 306 for display on display 308. To acknowledge a notification provided pursuant to the present invention, access the display of the message, the user may choose from functions listed under a menu presented as a result of user interaction with thumbwheel 318. If the message is an email message, the user may chose to respond to the email by selecting "Reply" from a menu presented on the display through interaction via thumbwheel 318 or via menu selection from keyboard 316. When the microprocessor 306 receives an indication that the message is to be sent, it processes the message for transport and, by directing and communicating with transmitter/receiver subsystem 300, enables the reply message to be sent via the wireless communications data network to the intended recipient. Similar interaction through I/O devices keyboard 316 and thumbwheel 318 can be used to initiate full-text messages or to forward messages to another party. The device 24 is preferably Bluetooth™ enabled.

After the redirector has determined that a particular message should be redirected, and it has prepared the message for redirection, the software 12 then sends the message A to a secondary memory store located in the mobile device 24, using whatever means are necessary. In the preferred embodiment this method is to send the message A back over the LAN 14, WAN 18, and through the wireless gateway 20 to the mobile data communication device 24. In doing so, the redirector preferably repackages message A as an E-mail with an outer envelope B that contains the addressing information of the mobile device 24, although alternative repackaging techniques and protocols could be used, such as a TCP/EP repackaging and delivery method (most commonly used in the alternative server configuration shown in FIG. 2). The wireless gateway 20 it, requires this outer envelope information B in order to know where to send the redirected message A. Once the message (A in B) is received by the mobile device 24, the outer envelope B is removed and the original message A is placed in the secondary memory store within the mobile device 24. By repackaging and removing the outer envelope in this manner, the present invention causes the mobile computer 24 to appear to be at the same physical location as the host system 10, thus creating a transparent system.

In the case where message C is representative of an external message from a computer on the Internet 18 to the host system 10, and the host 10 has been configured to redirect messages of type C, then in a similar manner to message A, message C would be repackaged with an outer envelope B and transmitted to the user's mobile device 24. In the case where message C is representative of a command message from the user's mobile device 24 to the host system 10, the command message C is not redirected, but is acted upon by the host system 10.

If the redirected user data item is an E-mail message, as described above, the user at the mobile device 24 sees the original subject, sender's address, destination address, carbon copy and blind carbon copy. When the user replies to this message, or when the user authors a new message, the software operating at the mobile device 24 adds a similar outer envelope to the reply message (or the new message) to cause the message to be routed first to the user's host system 10, which then removes the outer envelope and redirects the message to the final destination, such as back to computer 26. In the preferred embodiment, this results in the outgoing redirected message from the user's host system 10 being sent using the E-mail address of the host mailbox, rather than the address of the mobile device, so that it appears to the recipient of the message that the message originated from the user's desktop system 10 rather than the mobile data communication device. Any replies to the redirected message will then be sent to the desktop system 10, which if it is still in redirector mode, will repackage the reply and resend it to the user's mobile data device, as described above.

Figure 2:
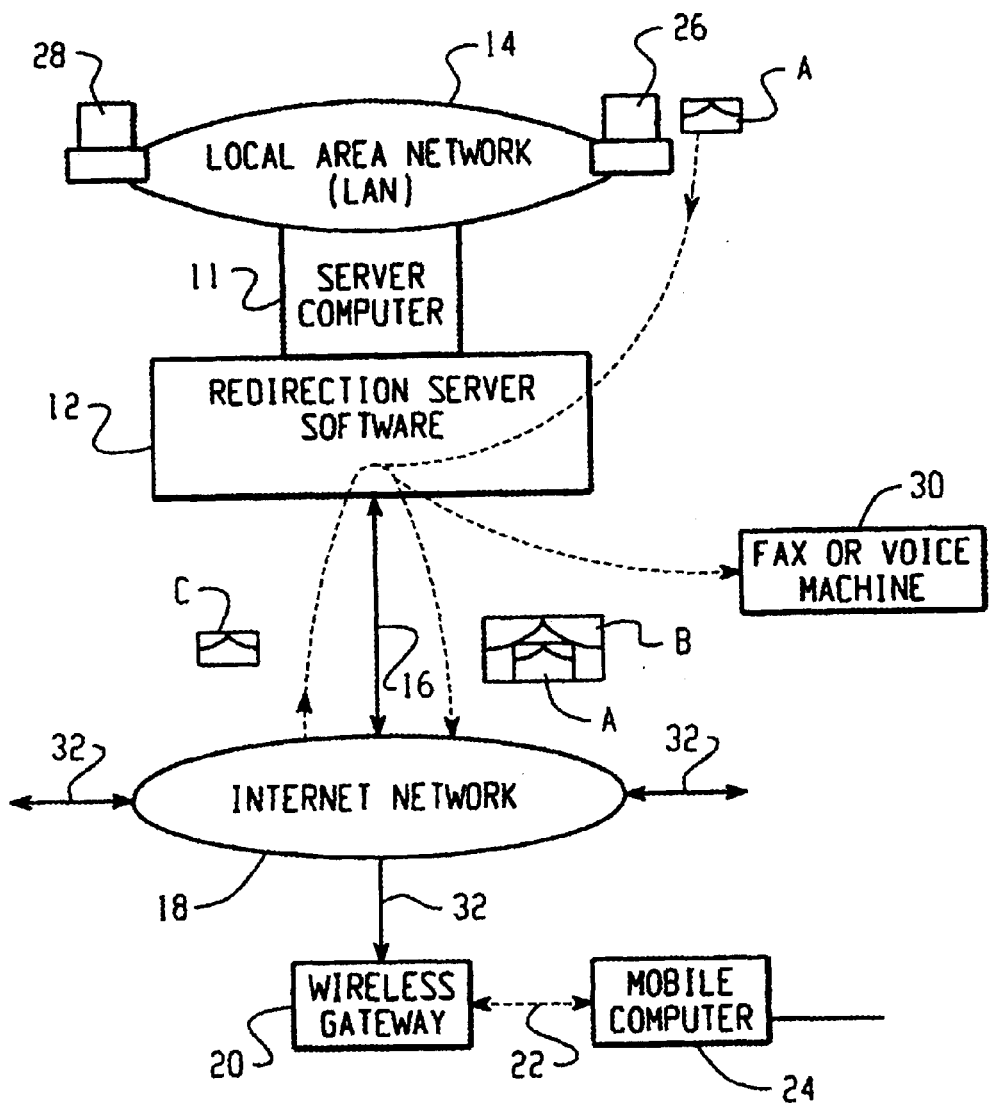
FIG. 2 is a system diagram showing the redirection of user data items from a network server (host system) to the user's mobile data communication device, where the redirector software is operating at the server.

FIG. 2 is an alternative system diagram showing the redirection of user data items from a network server 11 to the user's mobile data communication device 24, where the redirector software 12 is operating at the server 11. This configuration is particularly advantageous for use with message servers such as Microsoft's® Exchange Server, which is normally operated so that all user messages are kept in one central location or mailbox store on the server instead of in a store within each user's desktop PC. This configuration has the additional advantage of allowing a single system administrator to configure and keep track of all users having messages redirected. If the system includes encryption keys, these too can be kept at one place for management and update purposes.

In this alternative configuration, server 11 preferably maintains a user profile for each user's desktop system 10, 26, 28, including information such as whether a particular user can have data items redirected, which types of message and information to redirect, what events will trigger redirection, the address of the users' mobile data communication device 24, the type of mobile device, and the user's preferred list, if any. The event triggers are preferably detected at the user's desktop system 10, 26, 28 and can be any of the external, internal or network events listed above. The desktop systems 10, 26, 28 preferably detect these events and then transmit a message to the server computer 11 via LAN 14 to initiate redirection. Although the user data items are preferably stored at the server computer 11 in this embodiment, they could, alternatively, be stored at each user's desktop system 10, 26, 28, which would then transmit them to the server computer 11 after an event has triggered redirection.

As shown in FIG. 2, desktop system 26 generates a message A that is transmitted to and stored at the host system 11, which is the network server operating the redirector program 12. The message A is for desktop system 10, but in this embodiment, user messages are stored at the network server 11. When an event occurs at desktop system 10, an event trigger is generated and transmitted to the network server 11, which then determines who the trigger is from, whether that desktop has redirection capabilities, and if so, the server (operating the redirector program) uses the stored configuration information to redirect message A to the mobile computer 24 associated with the user of desktop system 10.

As described above with reference to FIG. 1, message C could be either a command message from a user's mobile data communication device 24, or it could be a message from an external computer, such as a computer connected to the Internet 18. If the message C is from an Internet computer to the user's desktop system 10, and the user has redirection capabilities, then the server 11 detects the message C, repackages it using electronic envelope B, and redirects the repackaged message (C in B) to the user's mobile device 24. If the message C is a command message from the user's mobile device 24, then the server 11 simply acts upon the command message.

Figure 3:
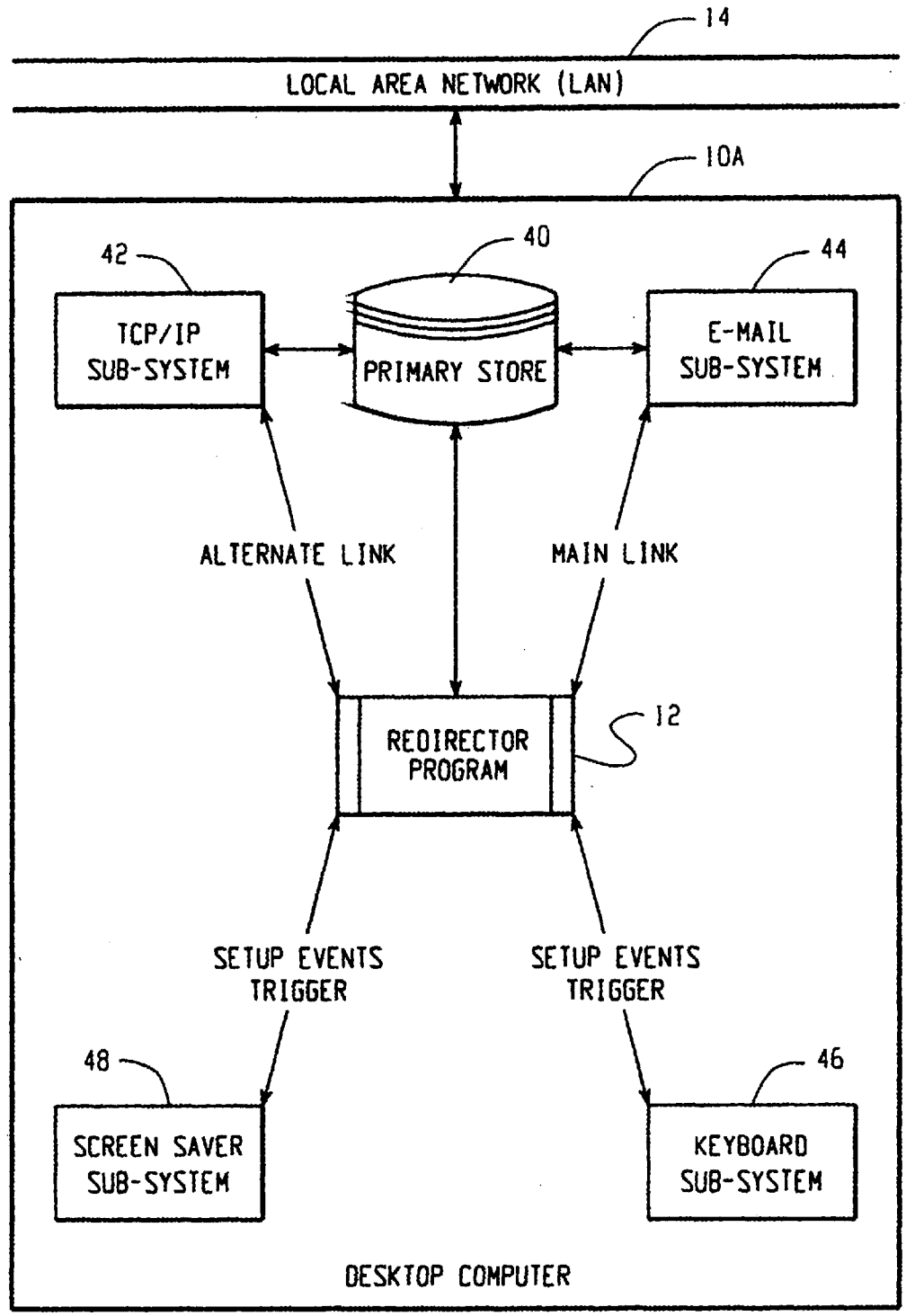
FIG. 3 is a block diagram showing the interaction of the redirector software with other components of the host system in FIG. 1 (the user's desktop PC) to enable the pushing of information from the host system to the user's mobile data communication device.

Turning now to FIG. 3, a block diagram showing the interaction of the redirector software 12 with additional components of the host system 10 of FIG. 1 (the desktop PC) to enable more fully the pushing of information from the host system 10 to the user's mobile data communication device 24 is set forth. These additional components are illustrative of the type of event-generating systems that can be configured and used with the redirector software 12, and of the type of repackaging systems that can be used to interface with the mobile communication device 24 to make it appear transparent to the user.

The desktop system 10 is connected to LAN 14, and can send and receive data, messages, signals, event triggers, etc., to and from other systems connected to the LAN 14 and to external networks 18, 22, such as the Internet or a wireless data network, which are also coupled to the LAN 14. In addition to the standard hardware, operating system, and application programs associated with a typical microcomputer or workstation, the desktop system 10 includes the redirector program 12, a TCP/IP sub-system 42, an E-mail sub-system 44, a primary data storage device 40, a screen saver sub-system 48, and a keyboard sub-system 46. The TCP/IP and E-mail subsystems 42, 44 are examples of repackaging systems that can be used to achieve the transparency of the present invention, and the screen saver and keyboard sub-systems 46, 48 are examples of event generating systems that can be configured to generate event messages or signals that trigger redirection of the user selected data items.

The method steps carried out by the redirector program 12 are described in more detail in FIG. 4. The basic functions of this program are: (1) configure and setup the user-defined event trigger points that will start redirection; (2) configure the types of user data items for redirection and optionally configure a preferred list of senders whose messages are to be redirected; (3) configure the type and capabilities of the user's mobile data communication device; (4) receive messages and signals from the repackaging systems and the event generating systems; and (5) command and control the redirection of the user-selected data items to the mobile data communication device via the repackaging systems. Other functions not specifically enumerated could also be integrated into this program.

The E-Mail sub-system 44 is the preferred link to repackaging the user-selected data items for transmission to the mobile data communication device 24, and preferably uses industry standard mail protocols, such as SMTP, POP, IMAP, MIME and RFC-822, to name but a few. The E-Mail sub-system 44 can receive messages A from external computers on the LAN 14, or can receive messages C from some external network such as the Internet 18 or a wireless data communication network 22, and stores these messages in the primary data store 40. Assuming that the redirector 12 has been triggered to redirect messages of this type, the redirector detects the presence of any new messages and instructs the E-Mail system 44 to repackage the message by placing an outer wrapper B about the original message A (or C), and by providing the addressing information of the mobile data communication device 24 on the outer wrapper B. As noted above, this outer wrapper B is removed by the mobile device 24, and the original message A (or C) is then recovered, thus making the mobile device 24 appear to be the desktop system 10.

In addition, the E-Mail sub-system 44 receives messages back from the mobile device 24 having an outer wrapper with the addressing information of the desktop system 10, and strips this information away so that the message can be routed to the proper sender of the original message A (or C). The E-Mail sub-system also receives command messages C from the mobile device 24 that are directed to the desktop system 10 to trigger redirection or to carry out some other function. The functionality of the E-Mail sub-system 44 is controlled by the redirector program 12.

The TCP/IP sub-system 42 is an alternative repackaging system. It includes all of the functionality of the E-Mail sub-system 44, but instead of repackaging the user-selected data items as standard E-mail messages, this system repackages the data items using special-purpose TCP/IP packaging techniques. This type of special-purpose sub-system is useful in situations where security and improved speed are important to the user. The provision of a special-purpose wrapper that can only be removed by special software on the mobile device 24 provides the added security, and the bypassing of E-mail store and forward systems can improve speed and real-time delivery.

As described previously, the present invention can be triggered to begin redirection upon detecting numerous external, internal and networked events, or trigger points. Examples of external events include: receiving a command message from the user's mobile data communication device 24 to begin redirection; receiving a similar message from some external computer; sensing that the user is no longer in the vicinity of the host system; or any other event that is external to the host system. Internal events could be a calendar alarm, screen saver activation, keyboard timeout, programmable timer, or any other user-defined event that is internal to the host system. Networked events are user-defined messages that are transmitted to the host system from another computer that is connected to the host system via a network to initiate redirection.

The screen saver and keyboard sub-systems 46, 48 are examples of systems that are capable of generating internal events. Functionally, the redirector program 12 provides the user with the ability to configure the screen saver and keyboard systems so that under certain conditions an event trigger will be generated that can be detected by the redirector 12 to start the redirection process. For example, the screen saver system can be configured so that when the screen saver is activated, after, for example, 10 minutes of inactivity on the desktop system, an event trigger is transmitted to the redirector 12, which starts redirecting the previously selected user data items. In a similar manner the keyboard sub-system can be configured to generate event triggers when no key has been depressed for a particular period of time, thus indicating that redirection should commence. These are just two examples of the numerous application programs and hardware systems internal to the host system 10 that can be used to generate internal event triggers.

Figure 5:
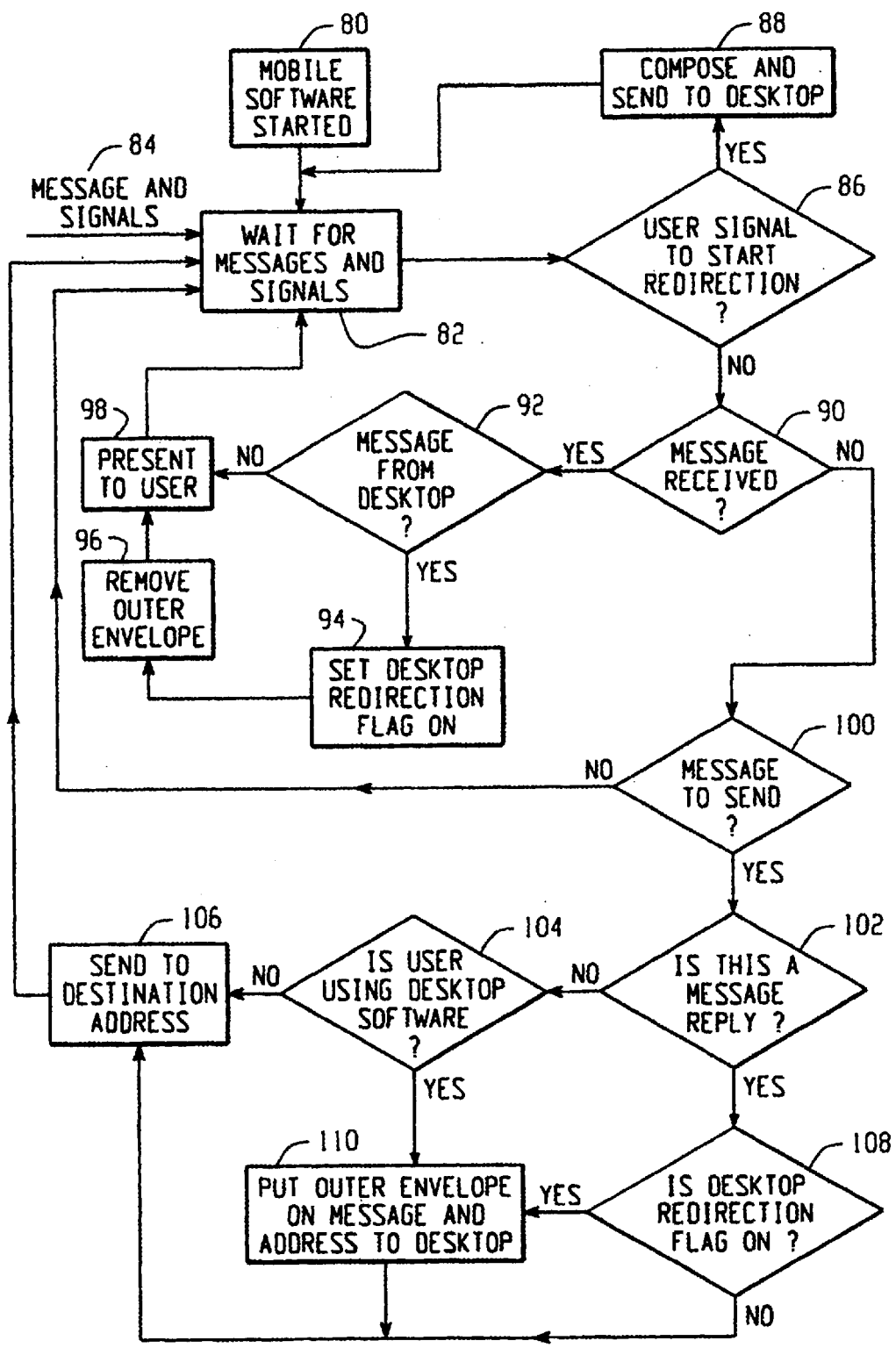
FIG. 5 is a flow chart showing the steps carried out by the mobile data communication device to interface with the redirector software operating at the host system.

FIGS. 4 and 5, set forth, respectively, flow charts showing the steps carried out by the redirector software 12 operating at the host system 10, and the steps carried out by the mobile data communication device 24 in order to interface with the host system. Turning first to FIG. 4, at step 50, the redirector program 12 is started and initially configured. The initial configuration of the redirector 12 includes: (1) defining the event triggers that the user has determined will trigger redirection; (2) selecting the user data items for redirection; (3) selecting the repackaging sub-system, either standard E-Mail, or special-purpose technique; (4) selecting the type of data communication device, indicating whether and what type of attachments the device is capable of receiving and processing, and inputting the address of the mobile device; and (5) configuring the preferred list of user selected senders whose messages are to be redirected.

FIG. 4 sets forth the basic steps of the redirector program 12 assuming it is operating at a desktop system 10, such as shown in FIG. 1. If the redirector 12 is operating at a network server 11, as shown in FIG. 2, then additional configuration steps may be necessary to enable redirection for a particular desktop system 10, 26, 28 connected to the server, including: (1) setting up a profile for the desktop system indicating its address, events that will trigger redirection, and the data items that are to be redirected upon detecting an event; (2) maintaining a storage area at the server for the data items; and (3) storing the type of data communication device to which the desktop system's data items are to be redirected, whether and what type of attachments the device is capable of receiving and processing, and the address of the mobile device. The configuration process may also include the priority ranking of certain data items that are to be redirected. For instance, email messages from individual K may be marked as very important priority ranking while email messages all other individuals are regular importance priority ranking. Likewise, calendar events having individual K as an attendee are marked as very important priority ranking while all other calendar events are normal priority. In this manner the redirector program may mark the data items as data items are redirected in the user-selected prioritization for appropriate notification at the user's mobile communication device.

Once the redirector program is configured 50, the trigger points (or event triggers) are enabled at step 52. The program 12 then waits 56 for messages and signals 54 to begin the redirection process. A message could be an E-Mail message or some other user data item than may have been selected for redirection, and a signal could be a trigger signal, or could be some other type of signal that has not been configured as an event trigger. When a message or signal is detected, the program determines 58 whether it is one of the trigger events that has been configured by the user to signal redirection. If so, then at step 60 a trigger flag is set, indicating that subsequently received user data items (in the form of messages) that have been selected for redirection should be pushed to the user's mobile data communication device 24.

If the message or signal 54 is not a trigger event, the program then determines at steps 62, 68 and 66 whether the message is, respectively, a system alarm 62, an E-Mail message 64, or some other type of information that has been selected for redirection. If the message or signal is none of these three items, then control returns to step 56, where the redirector waits for additional messages 54 to act upon. If, however the message is one of these three types of information, then the program 12 determines, at step 68, whether the trigger flag has been set, indicating that the user wants these items redirected to the mobile device. If the trigger flag is set, then at step 70, the redirector 12 causes the repackaging system (E-Mail or TCP/IP) to add the outer envelope to the user data item, and at step 72 the repackaged data item is then redirected to the user's mobile data communication device 24 via LAN 14, WAN 18, wireless gateway 20 and wireless network 22. At step 72, the repackaging may also include the marking of the data item as to its data item type and/or priority level. Control then returns to step 56 where the program waits for additional messages and signals to act upon. Although not shown explicitly in FIG. 4, after step 68, the program could, if operating in the preferred list mode, determine whether the sender of a particular data item is on the preferred list, and if not, then the program would skip over steps 70 and 72 and proceed directly back to step 56. If the sender was on the preferred list, then control would similarly pass to steps 70 and 72 for repackaging and transmission of the message from the preferred list sender.

FIG. 5 sets forth the method steps carried out by the user's mobile data communication device 24 in order to interface to the redirector program 12 of the present invention. At step 80 the mobile software is started and the mobile device 24 is configured to operate with the system of the present invention, including, for example, storing the address of the user's desktop system 10.

At step 82, the mobile device waits for messages and signals 84 to be generated or received. Assuming that the redirector software 12 operating at the user's desktop system 10 is configured to redirect upon receiving a message from the user's mobile device 24, at step 86, the user can decide to generate a command message that will start redirection. If the user does so, then at step 88 the redirection message is composed and sent to the desktop system 10 via the wireless network 22, through the wireless gateway 20, via the Internet 18 to the LAN 14, and is finally routed to the desktop machine 10. In this situation where the mobile device 24 is sending a message directly to the desktop system 10, no outer wrapper is added to the message (such as message C in FIGS. 1 and 2). In addition to the redirection signal, the mobile device 24 could transmit any number of other commands to control the operation of the host system, and in particular the redirector program 12. For example, the mobile 24 could transmit a command to put the host system into the preferred list mode, and then could transmit additional commands to add or subtract certain senders from the preferred list. In this manner, the mobile device 24 can dynamically limit the amount of information being redirected to it by minimizing the number of senders on the preferred list. Other example commands include: (1) a message to change the configuration of the host system to enable the mobile device 24 to receive and process certain attachments; (2) a message to instruct the host system to redirect an entire data item to the mobile device in the situation where only a portion of a particular data item has been redirected; (3) a message to instruct the host system to modify the priority level associated with classes or sub-classes of data items.

Turning back to FIG. 5, if the user signal or message is not a direct message to the desktop system 10 to begin redirection (or some other command), then control is passed to step 90, which determines if a message has been received. If a message is received by the mobile, and it is a message from the user's desktop 10, as determined at step 92, then at step 94 a desktop redirection flag is set "on" for this message, and control passes to step 96 where the outer envelope is removed. Following step 96, or in the situation where the message is not from the user's desktop, as determined at step 92, control passes to step 98, which displays the message for the user on the mobile device's display. The mobile unit 24 then returns to step 82 and waits for additional messages or signals.

Figure 7:
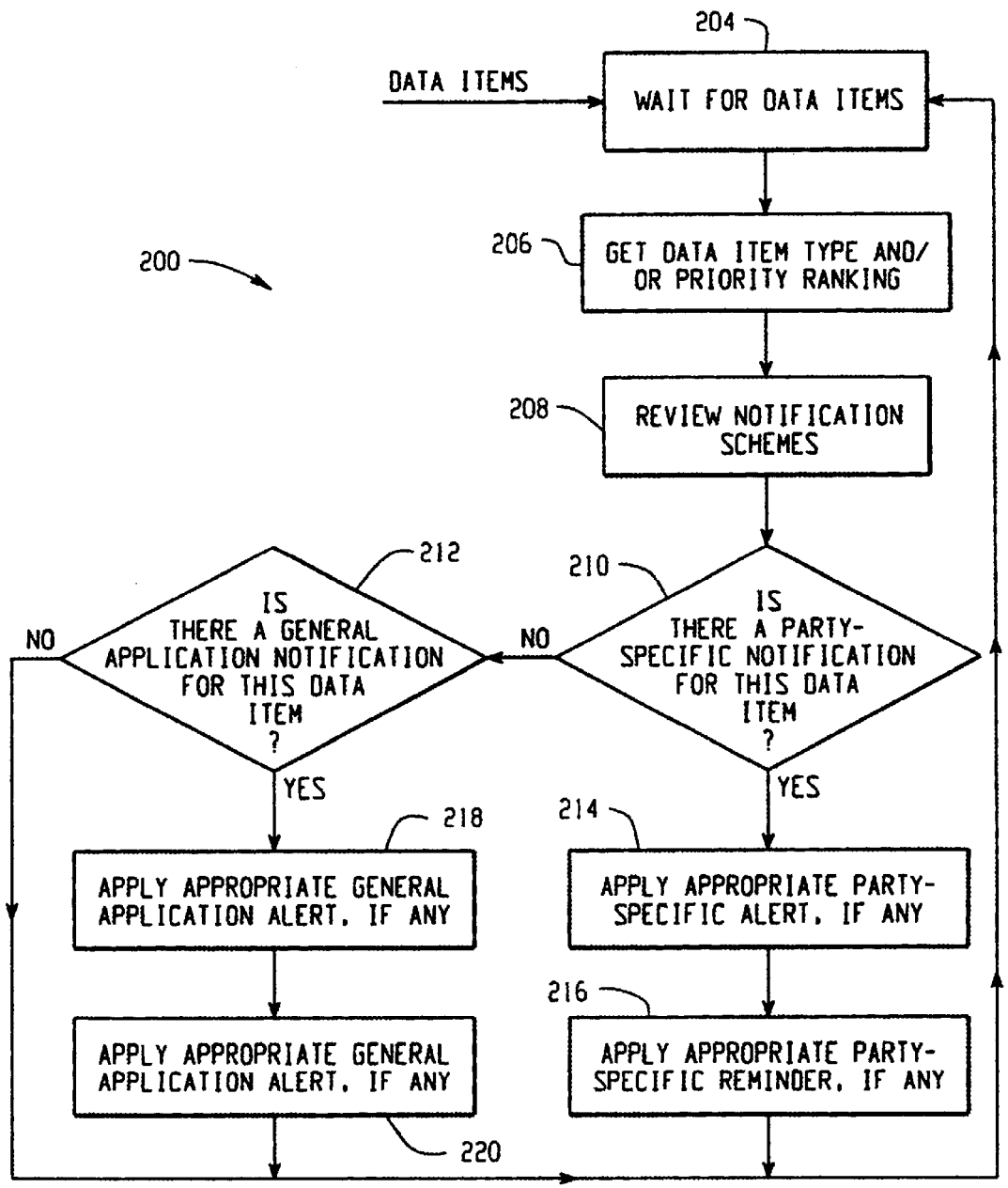
FIG. 7 is illustrative of the steps undertaken by the notification module at the mobile device 24 of the present invention prior to presenting to the user a notifiable data item.

In an alternative embodiment of the invention relating to the notification method and system of the present invention, following step 96 or step 92, control passes to step 200, which notifies the user of the data item according the present invention. FIG. 7 is illustrative of the steps undertaken by the notification module at the mobile device 24 of the present invention prior to presenting to the user at step 98. As will be understood upon the review of FIG. 7, the notification module will allow notification to the user of not only the arrival of data items from the host system, but also is useful in circumstances where the user would like distinct notification of (1) an unsuccessful transmission of a data item from the mobile device 24 to the host system x; (2) the arrival at the mobile device 24 of regular importance data items; (3) the arrival at the mobile device 24 of high importance data items (4) reminders of calendar events such as appointments having regular importance; (5) reminders of calendar events such as appointments having high importance; (6) the arrival at the mobile device 24 of calendar events; and (7) the arrival at the mobile device 24 of emergency notifications. At step 202, the mobile device 24 examines the data item and subsequently determines the data item type and the priority ranking at step 204, if any, associated with the data item. In the preferred embodiment of the notification module, a counter number embedded in the header of the data item may associate the data item type and priority associated therewith. Alternative marking methods may used in replace of or in conjunction with the counter number to indicate the data type and priority, and such alternative methods are well within the scope of the present invention. The mobile device 24 will get the data item type and any priority ranking associated with the data item at step 206. Next, the notification module will make reference to a user-selectable notification scheme store (not shown) at step 208. Upon reviewing the notification schemes in the store, the module will be able to make a determination of whether or not the data item requires notification via steps 210 and 212. More specifically, at step 210, the module determines whether there is a party-specific notification scheme for the data item. If a determination at step 210 results in the affirmative, the appropriate party-specific alert is called and acted upon at step 214. At step 216, the notification module will apply any reminder as set forth in the party-specific notification scheme. Control passes then back to step 204.

An emergency notification setting is defaulted as true. When the setting remains in this state, the emergency notification is useful in the instance where the user chooses to power down his entire mobile device ?.4 or just the radio component of the device. In such an instance, the assumption is that the user still desires to receive only extremely important data items, hence the name "emergency notification". In such an occurrence, a data item having a command associated therewith re-activates the mobile device only long enough to be received by the mobile device and powers down the radio component of the mobile device promptly thereafter so as to prevent any other transmission from arriving or departing from the device.

The present invention provides flexibility to the user by providing the user the capability to predetermine a set of notification rules. For instance, depending on the type of data item received by the notification module, the user may chose the notifcation module to act differently. In the preferred embodiment, notification types include visual, vibrate and audible notifications and within theses types of notifications there are sub-types of notifications such as tune 1, tune 2 and tune 3 for the audible signal notification. The user has control over this selection via a user interface (not shown) on the device.

If the mobile device 24 determines that a message has not been received at step 90, then control passes to step 100, where the mobile determines whether there is a message to send. If not, then the mobile unit returns to step 82 and waits for additional messages or signals. If there is at least one message to send, then at step 102 the mobile determines whether it is a reply message to a message that was received by the mobile unit. If the message to send is a reply message, then at step 108, the mobile determines whether the desktop redirection flag is on for this message. If the redirection flag is not on, then at step 106 the reply message is simply transmitted from the mobile device to the destination address via the wireless network 22. If, however, the redirection flag is on, then at step 110 the reply message is marked as to its data item type and priority level and repackaged with the outer envelope having the addressing information of the user's desktop system 10, and the repackaged message is then transmitted to the desktop system 10 at step 106. As described above, the redirector program 12 executing at the desktop system then strips the outer envelope and routes the reply message to the appropriate destination address using the address of the desktop system as the "from" field, so that to the recipient of the redirected message, it appears as though it originated from the user's desktop system rather than the mobile data communication device.

If, at step 102, the mobile determines that the message is not a reply message, but an original message, then control passes to step 104, where the mobile determines if the user is using the redirector software 12 at the desktop system 10, by checking the mobile unit's configuration. If the user is not using the redirector software 12, then the message is simply transmitted to the destination address at step 106. If, however, the mobile determines that the user is using the redirector software 12 at the desktop system 10, then control passes to step 110, where the message is marked for data item type and priority level and the outer envelope is added to the message. The repackaged original message is then transmitted to the desktop system 10 at step 106, which, as described previously, strips the outer envelope and routes the message to the correct destination. Following transmission of the message at step 106, control of the mobile returns to step 82 and waits for additional messages or signals.

Having described in detail the preferred embodiments of the present invention, including the preferred methods of operation, it is to be understood that this operation could be carried out with different elements and steps. This preferred embodiment is presented only by way of example and is not meant to limit the scope of the present invention which is defined by the following claims.

What is claimed:

1. A method of replicating data items from a host system to a mobile data communication device, comprising the steps of:
    receiving a plurality of data items at the host system, wherein the plurality of data items are transmitted to the host system from a plurality of remote systems;
    characterizing the plurality of data items at the host system by the host system automatically determining a data item type and a data item priority for each of the received data items;
    generating an e-mail message for each of the received data items, wherein the e-mail message includes the received data item and a header that includes the data item type and the data item priority determined by the host system in the characterizing step;
    configuring a plurality of notification schemes at the mobile data communication device, wherein each of the plurality of notification schemes includes a plurality of notification fields that determine whether a particular notification scheme should be applied to a particular data item and an alert type, and wherein the plurality of notification fields include a party specific field that identifies a person associated with the data item, a data item type field that identifies a type of the data item, and a data item priority field that identifies a priority ranking of the data item;
    redirecting the e-mail messages from the host system to the mobile data communication device;
    recovering the data items, the data item types and the data item priorities from the redirected e-mail messages at the mobile data communication device; and
    applying the plurality of notification schemes to the redirected data items at the mobile data communication device by determining whether each data item and its characterized data item type and data item priority matches the party specific field, the data item type field and the data item priority field, respectively, of a particular notification scheme of the plurality of notification schemes, and if so, then enabling the alert type at the mobile data communication device for the particular notification scheme that matches the data item.

2. The method of claim 1, further comprising the steps of:
    characterizing the plurality of data items at the mobile data communication device by automatically determining a data item type and a data item priority for each of the redirected data items;
    providing priority characterization input to the mobile data communication device that indicates whether the characterization step at the mobile data communication device should take priority over the characterization step at the host system; and
    if the priority characterization input indicates that the mobile data communication device takes priority over the host system, then using the data item type and-data item priority information from the characterization step at the mobile data communication device during the applying step to determine whether a particular notification scheme should be applied to the data item.

3. The method of claim 1, further comprising the steps of:
    providing a mobile data communication device having an associated earpiece with a speaker;

providing at least one notification scheme in which the alert type includes the spoken name of a person associated with the data item; and if the mobile data communication device determines that the at least one notification scheme should be applied to a data item, then outputting the spoken name of the person associated with the data item to the speaker of the earpiece.

4. The method of claim 1, further comprising the steps of:

configuring the mobile data communication device into a low power state in which the mobile data communication device can receive messages;

providing an emergency data item priority characterization;

redirecting a data item to the mobile data communication device in which the data item priority field is set to the emergency data item priority characterization;

receiving the data item at the mobile data communication device;

determining that the data item priority field is set to the emergency data item priority characterization, and in response, configuring the mobile data communication device into a normal power state and immediately displaying the data item on the mobile data communication device.

5. The method of claim 1, wherein the data item types include e-mail messages received from the remote systems, and further wherein the e-mail messages are characterized as either inbound e-mail data item types or outbound e-mail data item types.

6. The method of claim 5, wherein the e-mail messages are further characterized as transmission status data item types.

7. A method of redirecting e-mail messages and meeting notices from a host system to a mobile data communication device via a wireless network, comprising the steps of:

receiving e-mail messages and meeting notices from a plurality of remote systems at the host system;

generating a plurality of electronic envelopes at the host system, wherein the electronic envelopes include the received e-mail messages or the meeting notices;

the host system automatically generating characterization information regarding the electronic envelopes, the characterization information including a data item type that indicates whether the electronic envelope contains an e-mail message or a meeting notice and data item priority ranking that indicates a priority of the e-mail message or meeting notice;

the host system appending the characterization information to the electronic envelopes and redirecting the electronic envelopes from the host system to the mobile data communication device via the wireless network;

receiving the electronic envelopes at the mobile data communication device;

extracting the characterization information from the electronic envelopes;

comparing the characterization information to a plurality of stored notification schemes at the mobile data communication device to determine whether to enable a particular alert type associated with the notification scheme, wherein the notification scheme includes a user defined field for the data item type and the data item priority.

8. A method of automatically characterizing electronic data items at a messaging system prior to redirection to a wireless mobile communication device that applies a plurality of notification schemes to the characterized electronic data items, comprising the steps of:

receiving a plurality of data items at the messaging system;

the messaging system characterizing the plurality of data items by automatically determining a data item type and data item priority for each of the received plurality of data items;

the messaging system generating an e-mail message for each of the received data items that includes the data item and a header that includes the determined data item type and data item priority;

transmitting the e-mail messages from the messaging system to the wireless mobile communication device via a wireless gateway that couples the messaging system to a wireless data network;

receiving the e-mail messages at the wireless mobile communication device; and the wireless mobile communication device automatically determining the type and priority of each received data item by examining the header in the e-mail messages and comparing the data item type and data item priority information in the header to stored information in the wireless mobile communication device;

based on the comparison step, the wireless mobile communication device then applying one of a plurality of stored notification schemes to the received e-mail messages.

* * * * *